(12) United States Patent
Tarsa et al.

(10) Patent No.: US 10,172,215 B2
(45) Date of Patent: Jan. 1, 2019

(54) LED LAMP WITH REFRACTING OPTIC ELEMENT

(71) Applicant: Cree, Inc., Durham, NC (US)

(72) Inventors: Eric Tarsa, Goleta, CA (US); Michael John Bergmann, Raleigh, NC (US); David Power, Morrisville, NC (US); Jeremy Johnson, Fuquay Varina, NC (US); Jean Claude deSugny, Potomac, MD (US)

(73) Assignee: Cree, Inc., Durham, NC (US)

( * ) Notice: Subject to any disclaimer, the term of this patent is extended or adjusted under 35 U.S.C. 154(b) by 110 days.

(21) Appl. No.: 15/166,352

(22) Filed: May 27, 2016

(65) Prior Publication Data

US 2016/0273716 A1    Sep. 22, 2016

Related U.S. Application Data

(63) Continuation-in-part of application No. 14/657,062, filed on Mar. 13, 2015, now Pat. No. 9,702,512, and
(Continued)

(51) Int. Cl.
*H05B 37/02* (2006.01)
*F21V 8/00* (2006.01)
(Continued)

(52) U.S. Cl.
CPC ......... *H05B 37/0272* (2013.01); *F21K 9/232* (2016.08); *F21K 9/61* (2016.08);
(Continued)

(58) Field of Classification Search
CPC ....... H05B 37/0272; F21K 9/61; F21K 9/232; G02B 6/0001; F21Y 2113/13;
(Continued)

(56) References Cited

U.S. PATENT DOCUMENTS 3,581,162 A    5/1971  Wheatley
5,463,280 A   10/1995  Johnson
(Continued)

FOREIGN PATENT DOCUMENTS

EP    1058221 A2   12/2000
EP    0890059 B1    6/2004
(Continued)

OTHER PUBLICATIONS

U.S. Appl. No. 14/657,062, Office Action, dated Nov. 17, 2016.
(Continued)

*Primary Examiner* — Bao Q Truong
(74) *Attorney, Agent, or Firm* — Myers Bigel, P.A.

(57) ABSTRACT

A LED lamp has at least two LEDs to provide light of at least two different spectral outputs. An optic element has an entry surface disposed to receive the light from the LEDs. The entry surface includes refracting surfaces that refract the light tangentially. The refracting surfaces may extend radially relative to a center of the entry surface. The refracting surfaces may be continuously curved in cross-section where the refracting surfaces may include convex refracting surfaces and concave refracting surfaces.

21 Claims, 35 Drawing Sheets

Related U.S. Application Data a continuation-in-part of application No. 14/813,595, filed on Jul. 30, 2015.

(51) Int. Cl.
| | | |
|---|---|---|
| *F21K 9/61* | (2016.01) | |
| *F21K 9/232* | (2016.01) | |
| *F21V 23/00* | (2015.01) | |
| *F21Y 115/10* | (2016.01) | |
| *F21Y 113/13* | (2016.01) | |

(52) U.S. Cl.
CPC .......... *G02B 6/0001* (2013.01); *F21V 23/009* (2013.01); *F21Y 2113/13* (2016.08); *F21Y 2115/10* (2016.08)

(58) Field of Classification Search
CPC .... F21Y 2115/10; F21V 23/009; F21V 5/002; F21V 5/004; F21V 5/005
See application file for complete search history.

(56) References Cited

U.S. PATENT DOCUMENTS

| | | | |
|---|---|---|---|
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,033,092 A * | 3/2000 | Simon | F21S 2/00 362/219 |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,803,607 B1 | 10/2004 | Chan et al. | |
| 6,848,819 B1 | 2/2005 | Arndt et al. | |
| 6,864,513 B2 | 3/2005 | Lin et al. | |
| 6,948,829 B2 | 9/2005 | Verdes et al. | |
| 6,982,518 B2 | 1/2006 | Chou et al. | |
| 7,048,412 B2 | 5/2006 | Martin et al. | |
| 7,080,924 B2 | 7/2006 | Tseng et al. | |
| 7,086,756 B2 | 8/2006 | Maxik | |
| 7,086,767 B2 | 8/2006 | Sidwell et al. | |
| 7,144,135 B2 | 12/2006 | Martin et al. | |
| 7,165,866 B2 | 1/2007 | Li | |
| 7,172,314 B2 | 2/2007 | Currie et al. | |
| 7,354,174 B1 | 4/2008 | Yan | |
| 7,396,142 B2 | 7/2008 | Laizure, Jr. et al. | |
| 7,600,882 B1 | 10/2009 | Morejon et al. | |
| 7,726,836 B2 | 6/2010 | Chen | |
| 7,824,065 B2 | 11/2010 | Maxik | |
| 7,965,023 B1 | 6/2011 | Liang | |
| 8,021,025 B2 | 9/2011 | Lee | |
| 8,154,181 B1 | 4/2012 | Lin et al. | |
| 8,198,819 B2 | 6/2012 | Lenk | |
| 8,253,316 B2 | 8/2012 | Sun et al. | |
| 8,272,762 B2 | 9/2012 | Maxik et al. | |
| 8,274,241 B2 | 9/2012 | Guest et al. | |
| 8,277,082 B2 | 10/2012 | Dassanayake et al. | |
| 8,282,249 B2 | 10/2012 | Liang et al. | |
| 8,282,250 B1 | 10/2012 | Dassanayake et al. | |
| 8,292,468 B2 | 10/2012 | Narendran et al. | |
| 8,322,896 B2 | 12/2012 | Falicoff et al. | |
| 8,371,722 B2 | 2/2013 | Carroll | |
| 8,400,051 B2 | 3/2013 | Hakata et al. | |
| 8,415,865 B2 | 4/2013 | Liang et al. | |
| 8,421,320 B2 | 4/2013 | Chuang | |
| 8,421,321 B2 | 4/2013 | Chuang | |
| 8,421,322 B2 | 4/2013 | Carroll et al. | |
| 8,421,329 B2 | 4/2013 | Liang et al. | |
| 8,427,037 B2 | 4/2013 | Liang et al. | |
| 8,449,154 B2 | 5/2013 | Uemoto et al. | |
| 8,502,468 B2 | 8/2013 | Li et al. | |
| 8,556,465 B2 | 10/2013 | Lee et al. | |
| 8,641,237 B2 | 2/2014 | Chuang | |
| 8,653,723 B2 | 2/2014 | Cao et al. | |
| 8,696,168 B2 | 4/2014 | Li et al. | |
| 8,740,415 B2 | 6/2014 | Wheelock | |
| 8,750,671 B1 | 6/2014 | Kelly et al. | |
| 8,752,984 B2 | 6/2014 | Lenk et al. | |
| 8,760,042 B2 | 6/2014 | Sakai et al. | |
| 8,866,385 B2 | 10/2014 | Kitagawa et al. | |
| 9,052,067 B2 | 6/2015 | Van De Ven et al. | |
| 2004/0201990 A1 | 10/2004 | Meyer | |
| 2009/0129097 A1* | 5/2009 | Ewert | B29C 45/0025 362/328 |
| 2009/0184618 A1 | 7/2009 | Hakata et al. | |
| 2010/0148650 A1* | 6/2010 | Wu | F21V 3/02 313/1 |
| 2011/0215345 A1 | 9/2011 | Tarsa et al. | |
| 2012/0040585 A1 | 2/2012 | Huang | |
| 2012/0161626 A1 | 6/2012 | van de Ven et al. | |
| 2012/0287615 A1 | 11/2012 | Kothari | |
| 2013/0051002 A1 | 2/2013 | Draper et al. | |
| 2013/0093362 A1 | 4/2013 | Edwards | |
| 2013/0335966 A1 | 12/2013 | Yokota et al. | |
| 2014/0063837 A1 | 3/2014 | Rowlette, Jr. | |
| 2014/0211462 A1* | 7/2014 | Keller | F21S 2/00 362/231 |
| 2014/0268728 A1 | 9/2014 | Hussell et al. | |
| 2014/0293654 A1 | 10/2014 | Kato et al. | |
| 2015/0062892 A1 | 3/2015 | Krames et al. | |
| 2015/0085492 A1 | 3/2015 | Kato et al. | |
| 2016/0327236 A1* | 11/2016 | Benitez | F21V 5/04 |

FOREIGN PATENT DOCUMENTS

| | | |
|---|---|---|
| EP | 2385400 A2 | 9/2011 |
| EP | 2789893 A1 | 10/2014 |
| GB | 2345954 A | 7/2000 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |
| WO | 2013086694 A1 | 6/2013 |

OTHER PUBLICATIONS

U.S. Appl. No. 14/813,595, Office Action, dated Jun. 26, 2017.
U.S. Appl. No. 14/657,062, filed Mar. 13, 2015.
U.S. Appl. No. 14/813,595, filed Jul. 30, 2015.
Trade Show Hand-Out, "Looking for Partner," 20 pages.
Cree, Inc., International Patent Application No. PCT/US2016/020581, International Search Report and Written Opinion, dated May 31, 2016.

* cited by examiner

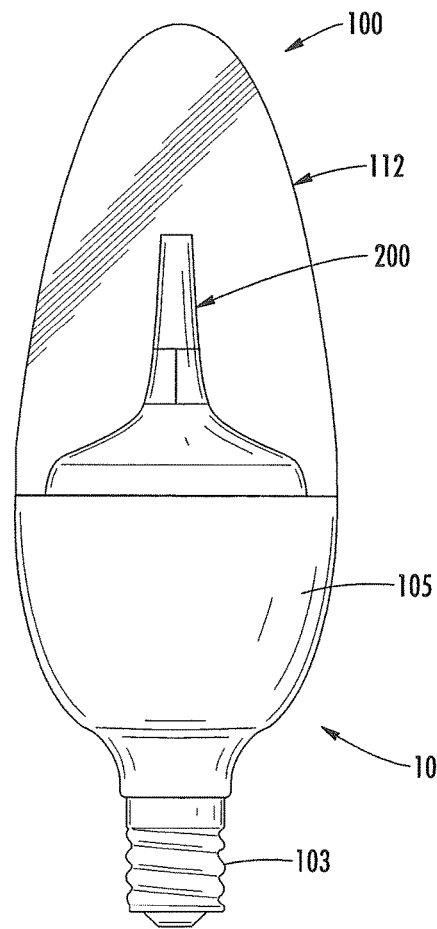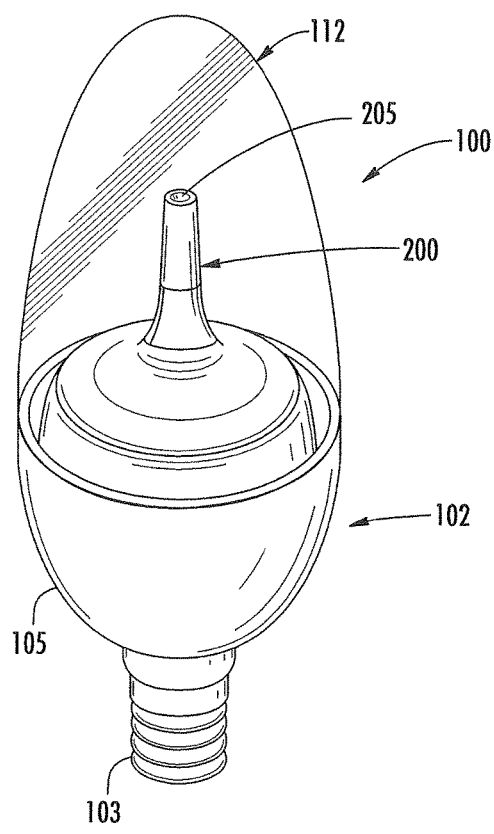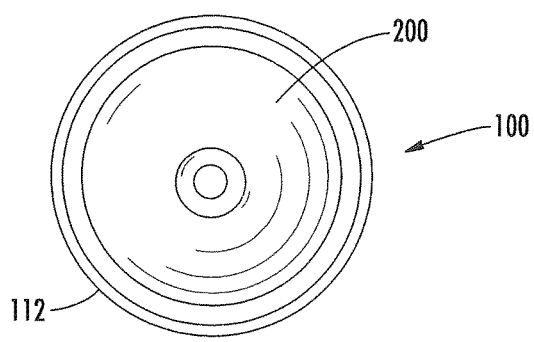
FIG. 1
FIG. 2
FIG. 3

| | | | | | | | |
|---|---|---|---|---|---|---|---|
| SINGLE PACKAGE | 0.2mm | 0.2mm | 0.2mm | 0.4mm | 0.2mm | 0.4mm | SPACING B/W LEDS |
| 4 X DIE | CUBIC | DOMED | CUBIC | | DOMED | | LENS |
| MHB | XQ | | XQ | | | | LED TYPE |
| SINGLE COLOR | | | TWO-COLORS | | | | BUILD TYPE |

*FIG. 14*

| | | | | | | | |
|---|---|---|---|---|---|---|---|
| SINGLE LED | 0.2mm | 0.2mm | 0.2mm | 0.4mm | 0.2mm | 0.4mm | SPACING B/W LEDS |
| 4 X DIE | CUBIC | DOMED | CUBIC | | DOMED | | LENS |
| MHB | XQ | | XQ | | | | LED TYPE |
| SINGLE COLOR | | | TWO-COLORS | | | | BUILD TYPE |

FIG. 16

LED LAMP WITH REFRACTING OPTIC ELEMENT

This application is a continuation-in-part (CIP) of U.S. application Ser. No. 14/657,062, as filed on Mar. 13, 2015, now U.S. Pat. No. 9,702,512, and is a continuation-in-part (CIP) of U.S. application Ser. No. 14/813,595, as filed on Jul. 30, 2015, now U.S. Pat. No. 9,909,723, both of which are incorporated by reference herein in their entirety.

BACKGROUND

Light emitting diode (LED) lighting systems are becoming more prevalent as replacements for legacy lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver any color light, and generally contain no lead or mercury. A solid-state lighting system may take the form of a luminaire, lighting unit, light fixture, light bulb, or a "lamp."

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a traditional bulb. LED lamps often include some type of optical element or elements to allow for localized mixing of colors and/or to provide a particular light pattern. Ideally, an LED lamp designed as a replacement for a traditional incandescent light source needs to be self-contained where a power supply is included in the lamp structure along with the LEDs or LED packages and the optical components. A heat sink may be provided to control the temperature of the LEDs.

SUMMARY

In some embodiments an LED lamp comprises at least two LEDs providing light of at least two different spectral outputs. An optic element comprises a refracting entry surface disposed to receive the light from the at least two LEDs where the refracting entry surface refracts the light with a tangential component.

The refracting entry surface may comprise a plurality of refracting surfaces. The plurality of refracting surfaces may extend radially on the refracting entry surface. The plurality of refracting surfaces may comprise a plurality of semi-conical surfaces. The plurality of refracting surfaces may comprise a plurality of continuously curved surfaces. The plurality of refracting surfaces may comprise a plurality of convex refracting surfaces alternating with a plurality of concave refracting surfaces. The plurality of refracting surfaces may extend along radii of the optic element such that the center of the entry surface is centered over the at least two LEDs. The entry surface may be surrounded by an annular guide surface. The annular guide surface may comprises a plurality of refracting surfaces that extend along a longitudinal axis of the lamp generally perpendicular to the entry surface. The annular guide surface may comprise a plurality of convex refracting surfaces alternating with a plurality of concave refracting surfaces. The convex refracting surfaces on the annular guide surface may meet the convex refracting surfaces on the entry surface. At least some of the radially extending plurality of refracting surfaces may not extend to the center of the entry surface. At least some of the plurality of refracting surfaces may extend for a different length than other ones of the plurality of refracting surfaces. The plurality of refracting surfaces may cover at least 50% of the entry surface. The optic element may comprises a diffusive outer portion generating back light.

In some embodiments a LED lamp comprises a plurality of LEDs that provide light of at least two different spectral outputs, such as different visible colors, disposed about a longitudinal axis. An optic element comprises an entry surface disposed to receive the light from the plurality of LEDs where the entry surface comprising refracting surfaces that refract the light with a tangential component relative to the longitudinal axis.

The refracting surfaces may extend radially relative to the longitudinal axis. The refracting surfaces may comprise a plurality of convex refracting surfaces and a plurality of concave refracting surfaces. The plurality of convex refracting surfaces and the plurality of concave refracting surfaces may define a sinusoidal line as the entry surface is traversed at a given radius. At least some of the refracting surfaces may not extend to the longitudinal axis.

In some embodiments, a LED lamp comprises at least two LEDs providing light of at least two different spectral outputs. An optic element comprises a first refracting entry surface disposed to receive the light from the at least two LEDs at a first angle and a second refracting entry surface disposed to receive the light from the at least two LEDs at a second angle.

The first refracting entry surface may have an elongated shape where a width of the first refracting entry surface is smaller than a length of the first refracting entry surface. The first refracting entry surface may have a first plurality of refracting surfaces arranged in a first pattern and the second refracting entry surface may have a second plurality of refracting surfaces arranged in a second pattern. The first refracting entry surface may have a first plurality of refracting surfaces arranged in a first pattern and a second plurality of refracting surfaces arranged in a second pattern. The top outer surface of the optic element may be relatively flat

BRIEF DESCRIPTION OF THE DRAWINGS

FIG. 1 is an external side view of a solid-state, LED lamp having a form factor of a candelabra bulb according to embodiments of the present invention.

FIG. 2 is a perspective view of the LED lamp of FIG. 1.

FIG. 3 is a bottom view of the LED lamp of FIG. 1.

FIG. 14 is a graph showing the efficiency of various configurations of an LED lamp according to example embodiments of the invention.

FIG. 16 is a graph showing the efficiency of further configurations of an LED lamp according to example embodiments of the invention.

DETAILED DESCRIPTION

Figure 4:
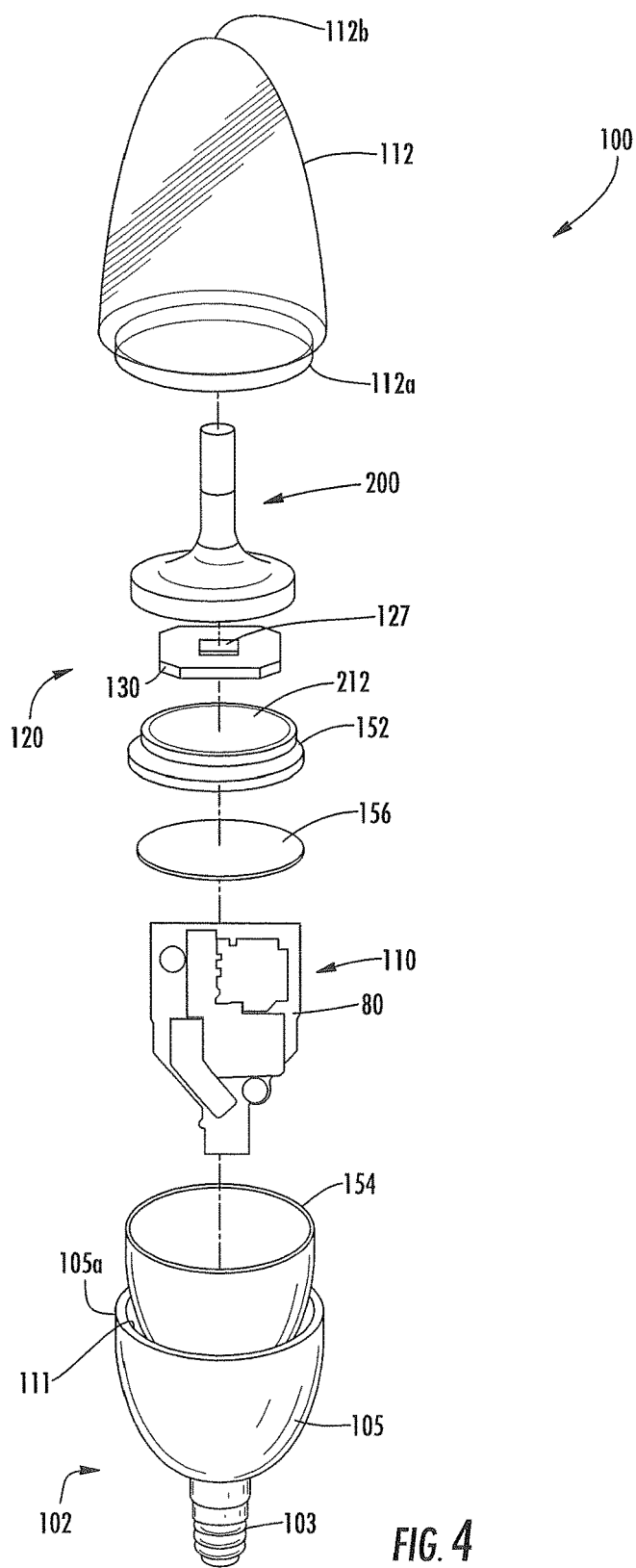
FIG. 4 is an exploded perspective view of the LED lamp of FIG. 1.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid-state light emitter" or "solid-state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid-state light emitters and/or multiple lumiphoric materials (i.e., in combination with at least one solid-state light emitter) may be used in a single device, such as to produce light perceived as white or near-white in character. In certain embodiments, the aggregated output of multiple solid-state light emitters and/or lumiphoric materials may generate warm white light output having a color temperature range of from about 2700K to about 4000K.

Solid-state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid-state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials may be associated with a lumiphor, a lumiphor binding medium, or a lumiphor support element that may be spatially segregated from a solid-state emitter.

For purposes of the discussion herein, the term "LED" will typically be used to refer to an entire light emitting device, meaning a device package with any chips and any optics that are a permanent part of the device package. The term in some cases may be used to refer to the semiconductor die or LED chip. An LED device package may have a single LED chip with a single light emitting area with our without a lumiphor, a plurality of LED chips, where some or all may have a lumiphor associated therewith, or a single LED chip with multiple light emitting areas. Such a chip may, for example, consist of a common substrate with multiple PN junctions and a local area of phosphor may be associated with one, some, or each of the PN junctions.

It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture.

The LED lamp of the invention may have a form factor that has the visual appearance of a traditional incandescent bulb. In some embodiments, the lamp has a connector such as an Edison screw that may be connected to a source of power, such as an Edison socket. In other embodiments the lamp may comprise a bayonet-style base that may be inserted into a bayonet-style socket. In a bayonet-style connector the lamp base comprises external lugs where the base and socket are configured to correspond to, and to have the external appearance of, standard bayonet connectors. Typically, in a bayonet connector the base is inserted into the socket and is rotated a partial turn to engage the lugs with lug receptacles in the socket. Standard Edison screws and bayonet connectors come in a variety of sizes. The Edison screw and bayonet connector may both provide the physical connection between the lamp and the fixture and form part of the electrical path for providing current from a power source to the LEDs. The lamp comprises an internal optic element that may be configured such that the optic element emits light in a visible pattern that has a visual appearance that mimics the light pattern emitted by a glowing incandescent filament of a traditional incandescent bulb.

Some traditional lights are intended to be used as candelabra bulbs. Candelabra bulbs refer to small base incandescent bulbs that are intended to be used in decorative light fixtures such as chandeliers, ceiling fans and other decorative fixtures to provide light and a decorative lighting effect. Candelabra bulbs are typically defined by a smaller size than the traditional standard incandescent bulb and may use, for example, an E12 Edison base rather than a larger E26 base, for example. In bulb nomenclature the E represents an Edison base and the number represents the base diameter in millimeters. Moreover, the optically transmissive enclosure in a candelabra bulb is typically smaller than in a classic incandescent bulb where the most common standard incandescent bulb may be defined by the ANSI standard A-series such as A19 or A21 where the number represents the diameter of the enclosure in eighths of an inch. Candelabra bulbs may be designated, for example, a B-series or C-series bulb such as C7 or C15. The shape of the enclosure in a candelabra bulb tends to have a narrower and more elongated profile than the "globe" shape of a traditional A-series bulb. As a result the interior space of a candelabra bulb may be smaller than the interior space of a typical A-series bulb.

As used herein a candelabra lamp means a lamp having base that may be 15 mm in diameter or smaller depending upon the type of base used. In an Edison base a candelabra lamp means a lamp having an E12 base or smaller base. For a bayonet base a candelabra lamp means a lamp having a BA15 base or smaller base. While the embodiments of the invention described herein have particular applicability to candelabra lamps the invention may be used in any size and style of lamp.

Figure 18:
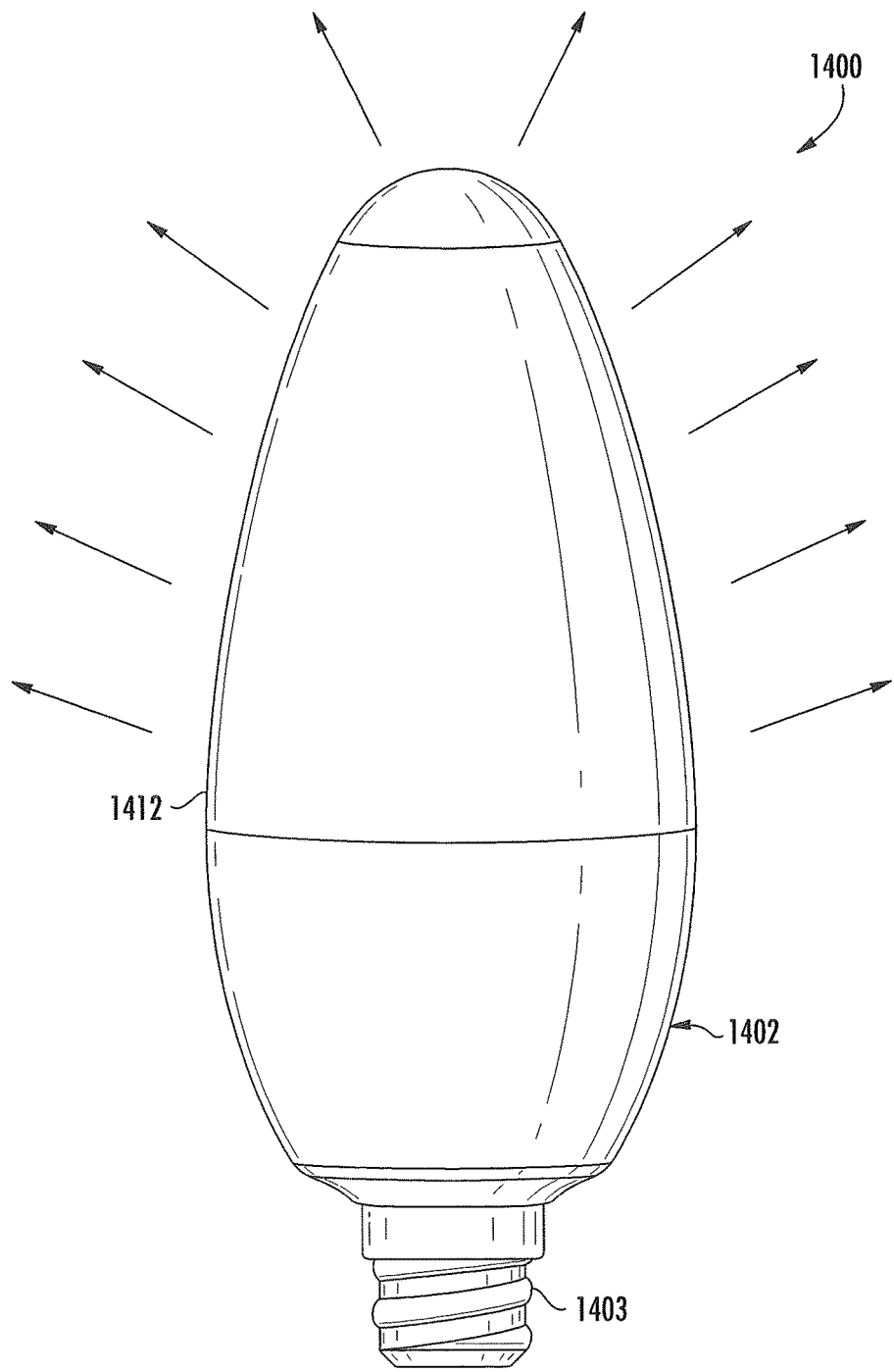
FIG. 18 is an external side view of a solid-state, LED lamp having a form factor of a candelabra bulb according to other embodiments of the present invention.

FIGS. 1 through 5 show a lamp 100 according to an embodiment of the present invention. Lamp 100 is shown having a candelabra form factor that may be similar to the form factor of a legacy incandescent candelabra bulb, or similar style bulb, with a non-optically transmissive base 102 and an optically transmissive enclosure 112. Lamp 100 may be designed to serve as a solid-state replacement for an incandescent candelabra bulb. Lamp 100 may have other form factors and may also have the size and form factor of a larger incandescent bulb, such as an A-series bulb such as an A19 or A21 bulb. The lamp 100 may conform to other standards or to other non-standard bulb form factors. Because the lamp 100 of the invention may be advantageously used to mimic the visual appearance of a traditional bulb the enclosure 112 may have a shape that conforms to traditional bulbs. The enclosure 112 is, in some embodiments, a transparent enclosure of similar shape to that commonly used in traditional incandescent candelabra bulbs and may have an elongated profile having a height that is significantly larger greater than its diameter. The enclosure 112 may be formed of glass, polycarbonate or other optically transmissive material. In some embodiments, the enclosure 112 may have a diffuse scattering layer that may be formed by a coating on the inside of the enclosure of silica, a diffusive film, the material of the enclosure may have diffusive properties or the like. Providing a diffuse scattering layer may produce a more uniform far field pattern. Where a diffusive layer is provided the internal structure may not be as clearly visible as shown in FIGS. 1 and 2 and the lamp may have a visual appearance such as shown in FIG. 18. It should also be noted that in this or any of the embodiments shown here, the optically transmissive enclosure 112 or a portion of the optically transmissive enclosure could be coated or impregnated with phosphor. Because the lamp as described herein may be used to mimic the appearance of traditional incandescent candelabra bulbs, the enclosure 112 may have a form factor that corresponds to the size and shape of a traditional bulb. The enclosure 112 may be transparent such that the glowing optic element 200 is visible through the enclosure 112. The enclosure 112 may also be made of a transparent colored material.

Figure 5:
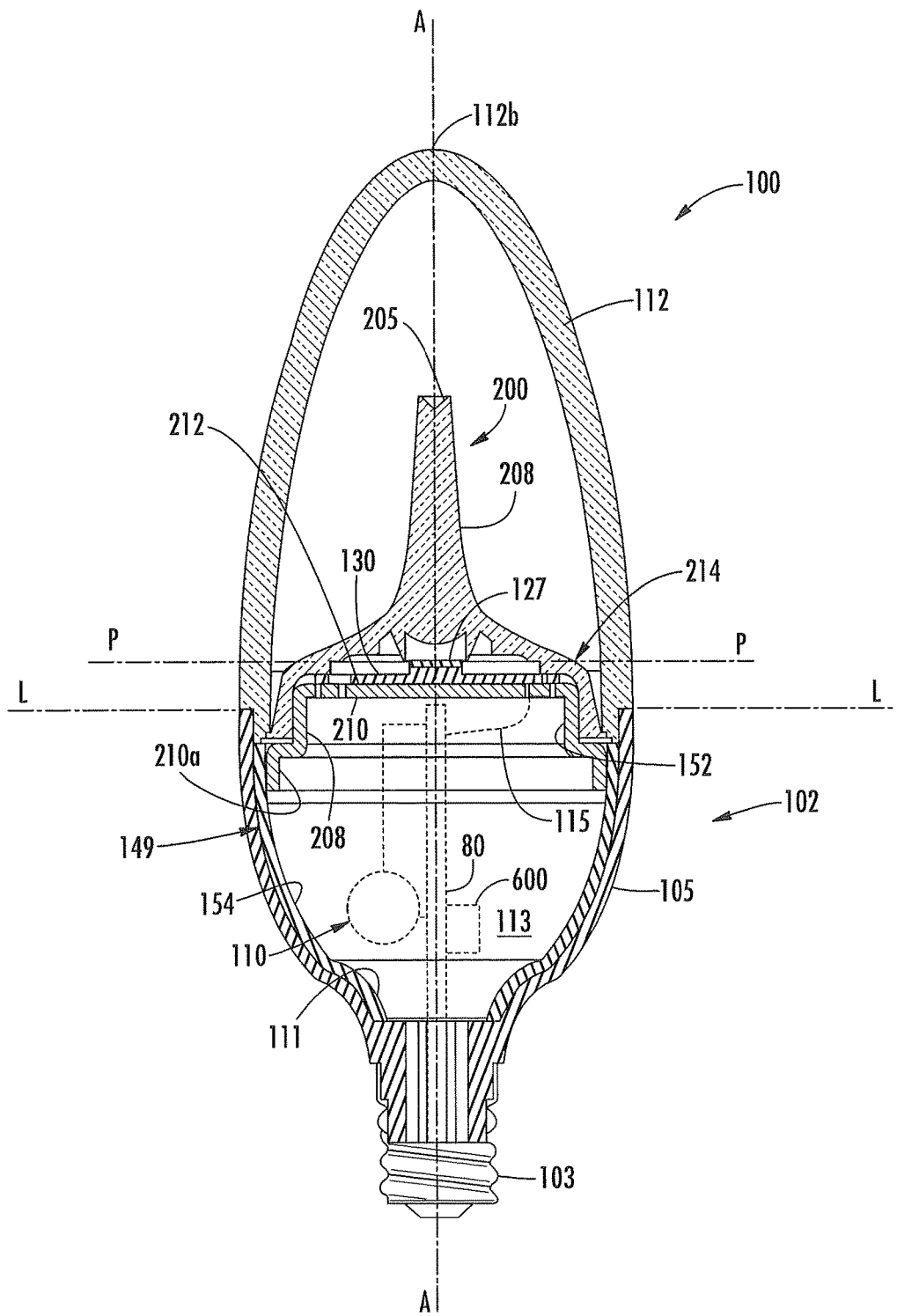
FIG. 5 is a section view of the LED lamp of FIG. 1.

Referring to FIGS. 4 and 5, the LED lamp is shown comprising a LED assembly 120 comprising an LED light source with light emitting LEDs and/or LED packages where multiple LEDs may be used together, forming an LED array. The LED light source is referred to herein as LED 127. The LED 127 can be mounted on or fixed within the lamp in various ways. In at least some example embodiments, a LED board 130 may be used to support the LED 127 and to form part of the electrical path to the LED. The LED board 130 may comprise a PCB, MCPCB, flex circuit, lead frame structure, flexible PCB or other similar structure. The LED 127 may comprise one or more LED dies and/or LED packages disposed in an encapsulant such as silicone, and LEDs which may be encapsulated with a phosphor to provide local wavelength conversion. A wide variety of LEDs and combinations of LEDs may be used. The optically non-transmissive base 102 may be connected to the enclosure 112 where the base retains the lamp electronics and functions as the physical and electrical connector to connect the lamp 100 to a corresponding socket. The base 102 may comprise an Edison base with an Edison screw 103 that comprises threads that engage an Edison socket such that the base 102 may be screwed into the socket in the same manner as a standard Edison screw. In one embodiment the base is an E12 base or smaller size. Depending on the embodiment, other base configurations are possible to make the electrical connection such as other traditional-style bases. For example, a bayonet-style connector may be used that may be connected to a bayonet-style socket. A bayonet connector is inserted into the socket such that lugs engage slots in the socket. The base is then rotated a partial turn to lock the lugs in the slots. The bayonet or Edison connector provides the physical connection between the lamp 100 and the fixture and may form part of the electrical path to the LED 127.

The screw 103, or other electrical connector, may be connected to a housing 105 by adhesive, mechanical connector, welding, separate fasteners or the like. The housing 105 may be made of an electrically insulating material such as plastic. In some embodiments the housing 105 may comprise a thermally conductive material where heat may be dissipated from the lamp in part using the housing 105. The housing 105 terminates in an upper end 105a that is connected to the lower end 112a of the enclosure 112 such that a first interior volume of the lamp is defined by the base 102 between the connector 103 and the upper end 105a and a second interior volume of the lamp is defined by the enclosure 112 between the lower end 112a and the distal end of the lamp 112b. Referring to FIG. 5, the line L-L represents the transverse plane dividing the interior volume of the optically transmissive enclosure 112 from the interior volume of the non-optically transmissive base 102. The line L-L is disposed substantially perpendicular to the longitudinal axis of the lamp A-A where the longitudinal axis A-A extends from the base 103 to the distal end of the lamp 112b. The interior volume defined by the enclosure 112 is optically transmissive such that light from the LED 127 may be emitted from the lamp from this volume. The interior volume defined by the base 102 is optically non-transmissive such that light is not emitted from this volume. In the illustrated embodiment the enclosure 112 extends beyond plane L-L slightly to provide a connector to the base 102; however, the base 102 overlays the enclosure 112 in this area such that the line L-L representing the plane between the optically transmissive portion of the lamp and the non-optically transmissive portion of the lamp.

The housing 105 and the Edison screw 103 (or bayonet connector) define an internal cavity 111 for receiving the electronics 110 of the lamp including the power supply and/or drivers or a portion of the electronics for the lamp. The lamp electronics 110 are electrically coupled to the Edison screw 103 such that the electrical connection may be made from the Edison screw 103 to the lamp electronics 110. The lamp electronics may be mounted on a printed circuit board 80 which includes the power supply, including large capacitor and EMI components that are across the input AC line along with the driver circuitry as described herein. The base may be potted to protect and isolate the lamp electronics 110. Electrical conductors 115 run between the lamp electronics 110 and the LED 127 to carry both sides of the supply to provide critical current to the LED 127.

In some embodiments, the lamp electronics 110 comprise a driver and/or power supply that are positioned partially in the base 102 as shown. Base 102 may include the power supply or driver and form all or a portion of the electrical path between the mains and the LED 127. The base 102 may also include only part of the power supply circuitry while some smaller components reside with the LED assembly 120. In one example embodiment, the inductors and capacitor that form part of the EMI filter are in the base. Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

The AC to DC conversion may be provided by a boost topology to minimize losses and therefore maximize conversion efficiency. The boost supply is connected to high voltage LEDs operating at greater than 200V. Examples of boost topologies are described in U.S. patent application Ser. No. 13/462,388, entitled "Driver Circuits for Dimmable Solid State Lighting Apparatus", filed on May 2, 2012 which is incorporated by reference herein in its entirety; and U.S. patent application Ser. No. 13/662,618, entitled "Driving Circuits for Solid-State Lighting Apparatus with High Voltage LED Components and Related Methods", filed on Oct. 29, 2012 which is incorporated by reference herein in its entirety. Other embodiments are possible using different driver configurations or a boost supply at lower voltages. The AC to DC conversion may also be provided by a buck topology or SEPIC topology. Other embodiments are possible using different driver configurations.

In some embodiments the driver circuit may have an input configured to be coupled to a power source, such as a phase cut dimmer, that provides a varying voltage waveform. The driver may include electromagnetic interference suppression electronics to reduce noise in the driver. One such suitable electronics is shown and described in U.S. patent application Ser. No. 14/284,643, entitled "Lighting apparatus with Inductor Current Limiting for Noise reduction", filed on May 22, 2014, which is incorporated by reference herein in its entirety.

Referring again to the figures, the LED assembly 120 may be thermally coupled to a heat sink. In some embodiments the LED board 130 is mounted on or to the heat sink 149. The LED board may be mounted directly on the heat sink or intermediate layers such as a layer of thermal adhesive may be used provided that the LED assembly is efficiently thermally coupled to the heat sink. The heat sink 149 may comprise a first portion 152 and a second portion 154 as shown for example in FIGS. 4 and 5. The first portion 152 supports the LED assembly 120 and may be referred to herein as a support and the second portion 154 may be referred to herein as an inner shell. In one embodiment the heat sink 149 is made of a thermally conductive material such as aluminum, zinc or the like. The heat sink 149 may be made of any thermally conductive material or combinations of thermally conductive materials.

The first portion 152 supports the LED assembly 120 and is dimensioned and configured to make good thermal contact with the LED assembly 120 such that heat generated by the LED assembly 120 may be efficiently transferred to the heat sink 149. The second portion 154 comprises a cup shaped member or shell that fits within the housing 105 and comprises an internal cavity 113 for receiving the board 80 and lamp electronics 110. The second portion 154 is in good thermal contact with the first portion 152 such that heat conducted away from the LED assembly 120 by the first portion 152 may be efficiently transferred to the second portion 154 and dissipated from the lamp 100. The heat sink 149 may have any suitable shape and configuration and in some embodiments may extend to the exterior of the lamp. A Mylar shield 156 may be located between the first portion 152 of the heat sink and the lamp electronics 110. To assemble the base, the second portion 154 of the heat sink may be positioned in housing 105. The electronics 110 may be positioned in the second portion 154 and an electrical connection may be made to Edison connector 103. The first portion 152 of the heat sink may be assembled to the second portion to complete the heat sink such that the lamp electronics 110 are located inside of the heat sink 149. An electrical connection is made from the lamp electronics 110 to the LED assembly 120 by electrical conductors 115.

The lamp 100 comprises an optic element 200 that is configured and positioned in the enclosure 112 such that it occupies approximately the same position as the glowing filament of a traditional incandescent bulb. The optic element 200 functions as a light guide or wave guide to transmit light from the LED 127 from a light entry surface 230 and to emit the light from the optic element 200. The optic element 200 may be configured and located in the area defined by the glowing filament in a traditional incandescent bulb such that the light emitting portion 202, 1202 (FIGS. 24-26 and 38) of the optic element 200 is configured in the lamp to have a visual appearance that is similar to or mimics the glowing filament of an incandescent bulb. The optic element 200 may be made of acrylic or other moldable optically transmitting plastic, other plastic material, glass or other light transmitting material. In one embodiment the optic element 200 is transparent. In one embodiment the optic element 200 may be a solid piece of material. Alternatively the optic element 200 may be formed as a hollow elongated member with an interior cavity that extends for the length of the elongated member. A single member may be used to make the optic element 200 or the optic element 200 may be made of a plurality of separate members. Light generated by the LED 127 is directed into the optic element 200 such that light may be transmitted through the optic element 200 to a light emitting portion 202, 1202 that emits light from the optic element 200 such that it is visible from the exterior of the lamp through the enclosure 112. The LED 127 may transmit light directly into the optic element 200 or a lens or other optical device may be provided that transmits light from the LED 127 to the optic element 200. In some embodiments a mixing chamber may be used to mix the light from the LED 127 before the light enters the optic element 200.

As previously mentioned, in some embodiments of the invention the lamp may be dimensioned to replace small, decorative incandescent bulbs, such as candelabra bulbs, although an embodiment of the invention can find use in any size or shape of LED lamp and with LEDs with any combination of spectral outputs.

Figure 6:
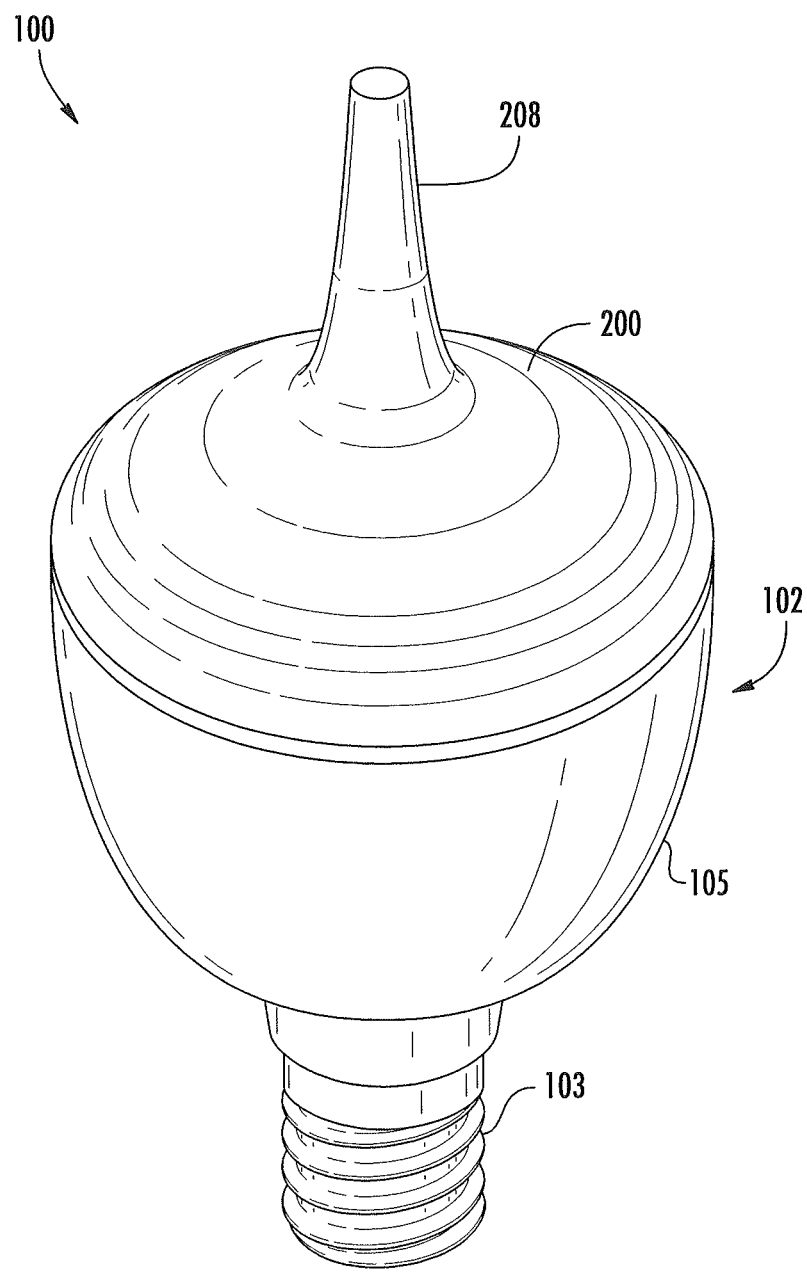
FIG. 6 is a perspective view of a LED lamp with the optically transmissive enclosure removed.

FIG. 6 is a perspective view of the entire base 102 of the candelabra lamp of FIG. 1 with the optically transmissive enclosure 112 removed so that the overall shape of the optic element 200 is visible. The optically transmissive enclosure 112 can be fastened with adhesive or fasteners over the optic element 200 and may be configured such that bottom edge 112a of the enclosure 112 is connected to the base 102 or to the optic element 200. If the bottom edge of the enclosure 112 is light transmissive the enclosure 112 may be optically transmissively coupled to the optic element 200.

Figure 7:
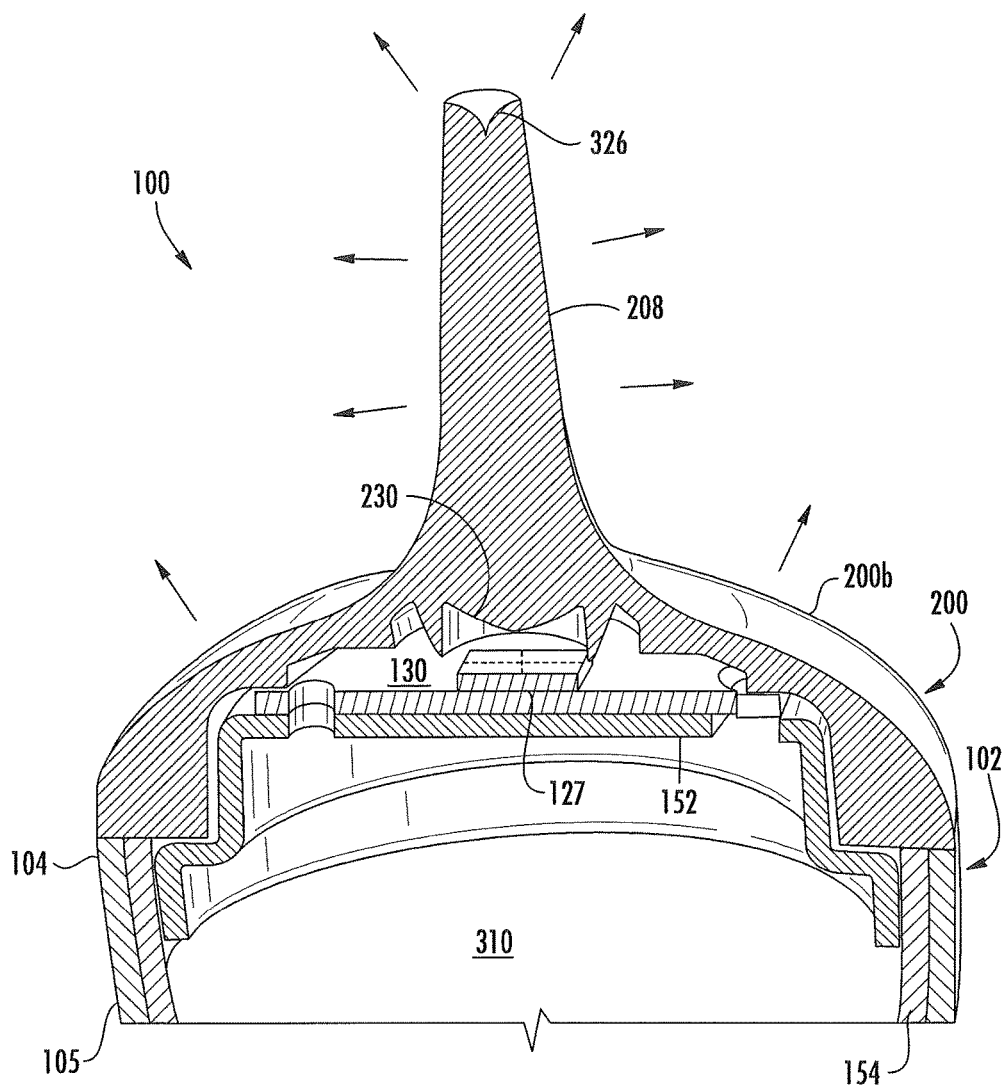
FIG. 7 is a perspective section view of the lamp of FIG. 6.

FIG. 7 is a partial perspective section view of lamp 100 with the enclosure 112 removed and the lamp electronics 110 such as the power supply components removed from base 102. In the working lamp, power supply components, including those for controlling current in the LEDs according to embodiments of the invention, are installed in the base, and may be potted or otherwise be made conforming to the shape of the base of the lamp as previously described. A power supply may also be referred to as a "driver" and thus the base 102 of a lamp like lamp 100 may be referred to as a "driver base." The base of lamp 100 as visible in FIG. 7 includes support 152 and circuit board 130, which forms a mounting surface on which an LED 127 can reside. The power supply in the base is normally connected to the LED 127 through conductors in the circuit board, which in turn is connected to the power supply through conductors (not shown in FIG. 7) running through support 152. Details of possible LED device package mounting configurations for a lamp like lamp 100 are discussed below. LED 127 may comprise one or multiple LED device packages and/or multiple light sources as indicated by the dotted lines in FIG. 7.

It should be noted that base 102 of lamp 100 can be constructed in various ways. As shown in FIGS. 4-7, the base 102 has two structural layers, 154 and 105. Alternatively, the base could be made with a single layer. In the illustrated embodiment, there is an inner shell 154 made of a thermally conductive material such as metal such as aluminum and an outer plastic shell 105. In some embodiments the outer shell is opaque, but in others it is clear and serves as an angular distribution optic, conducting some light from optic element 200 towards the bottom of the lamp where it is emitted so that the entire lamp appears to emit light as is the case with a traditional incandescent bulb.

Still referring to FIG. 7 optic element 200 has an elongated vertical part 208 that directs some light into the optically transmissive enclosure 112. In some embodiments, the bottom of the optic element 200 may direct light into an angular distribution optic. Light emanates from the top portion of the optic element 200 and out through optically transmissive enclosure 112 as shown by the arrows in FIG. 7, resulting in a natural, pleasing light pattern, especially for a bulb that may be installed in an open or transparent fixture. The vertical part 208 of optic element 200 in this example embodiment is tapered, and includes internally reflective surface 326 at the top end. The vertical part of the optic element 200 can also be referred to as an "optical tower" or a "stem" 208 and in this example has a diameter of about 3.4 mm at the top end. In some embodiments, the stem is narrower than the mounting surface for the LEDs, from this top portion all the way to its bottom, which is where its curvature mathematically disappears into that of the shell that covers the driver base. In some embodiments exit surface 326 follows a parabolic curve. Entry surface 230 receives light from LED 127 and directs light rays as appropriate to exit the optic element 200 at the top and sides to direct light through optically transmissive enclosure 112 and eventually emanate from the bulb.

The optic element 200 is configured so that some light propagates up the light guide through internal reflection while some light may escape the sides of the light guide. Depending on the design of the light guide, more of the light can be guided through internal reflection to the extraction surface at the end of the light guide. To further extract light along the length of the light guide, extraction surfaces can be positioned along the length of the light guide and/or at one end of the light guide. It should be noted that while the optic element 200 is pictured in a candelabra lamp, the same type of optic element can be used in a lamp of any size and with any LEDs of any spectral output or combination of spectral outputs. In other embodiments the optic element may have shapes other than that specifically shown in the drawings.

Figure 8:
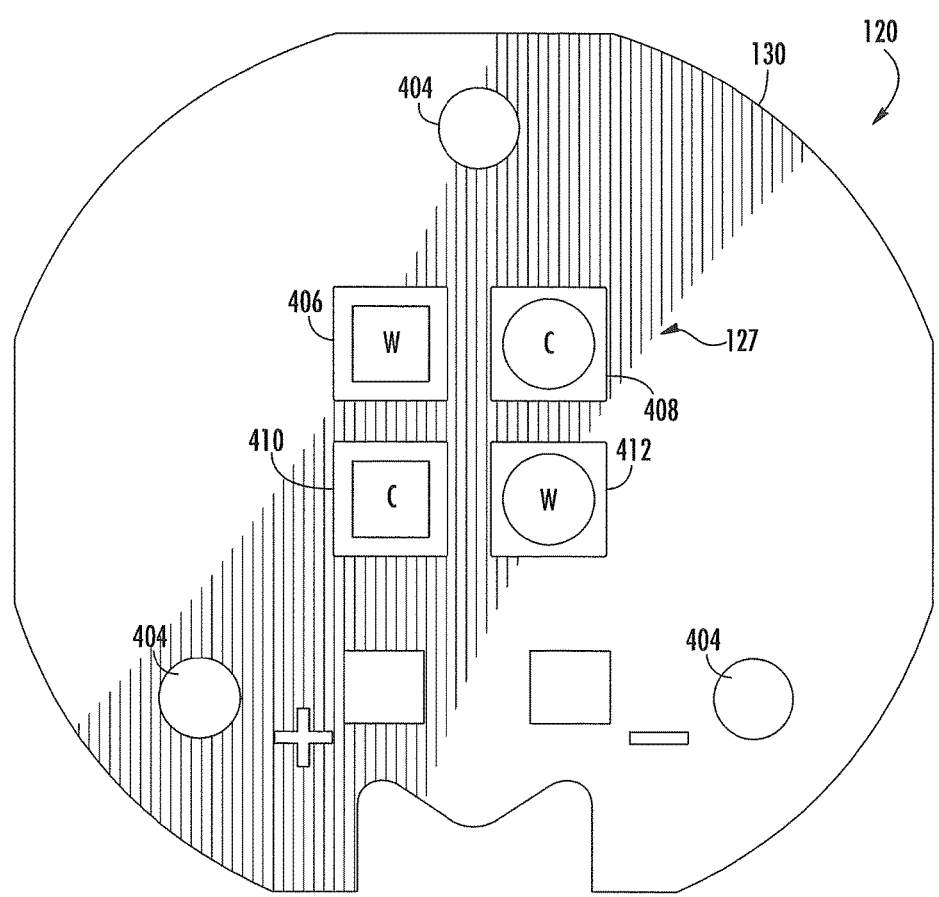
FIG. 8 is a top view of LEDs on the mounting surface of a circuit board within the lamp of some embodiments of the present invention.

FIG. 8 is a top view of LED assembly 120 comprising LED device package(s) which can be mounted under the optic element 200 and serve as a light source for a lamp according to some embodiments of the invention. Note that sizes and spacing of LED devices are enlarged for clarity. The figures are schematic in nature and may not be to scale. Circuit board 130 includes mounting holes 404 and power pads as indicated with plus and minus signs. As previously discussed, a lamp according to this example embodiment has at least two light emitting areas with two different spectral outputs to provide light of at least two different colors. In this particular embodiment, the lamp has four LED device packages, 406, 408, 410, and 412, disposed on the mounting surface of the circuit board 130 so that the optic element 200 receives the light from the LED packages. Each device package in this example contains a single LED chip. Each LED chip with any associated phosphor can be referred to herein as a light emitter. In some embodiments, each device package is roughly 1.6 mm square and the gaps between them are roughly 0.4 mm wide, so that the LED packages with differing spectral outputs (possibly after phosphor conversion within the device package) fit within a square "footprint" on the mounting surface that is from 3.6 mm to 4 mm on a side. In some embodiments, the LED device packages can be laid out in an irregular pattern, but if at least one dimension of the footprint is kept to this range, the footprint can be referred to by this size and the LED assembly can work in smaller, decorative lamps such as the candelabra lamp described herein. For other lamps including larger lamps such as lamps that fit the form factor of an A19, A21 or other standard bulb size the number of LEDs, the sizes of the LEDS and the spacing of the LEDs may be different than that described above.

Still referring to FIG. 8, at least a portion of the light from the device packages travels through the optic element 200, and light can generally be emitted from a lamp with a correlated color temperature of from 1200K to 3500K, depending on the CCTs of the LED devices used. In this particular example, the color of the light produced by the LEDs is indicated by the letters "w" for warmer and "c" for cooler. In addition, device packages 406 and 410 each have a cubic lens and device packages 408 and 412 each have a domed lens. In this example embodiment, the cooler LEDs emit light with a CCT of 3200K and the warmer LED devices emit light with a CCT of 2200K, both with a color rendering index (CRI) of 90. By disproportionate dimming of the LED devices relative to their spectral output, the color temperature of the light from the lamp can be reduced along with the light output when the lamp itself is dimmed. The mechanism for such dimming will be discussed below with reference to FIG. 13. Note a mixture of LED packages with differing spectral outputs where the CCT of the lamp changes when dimmed can be implemented in many kinds and sizes of LED lamps with various LED spectral outputs. Moreover, the LED packages with different spectral outputs may be used even without dimming to create light of a desired color and/or intensity.

Figure 9A:
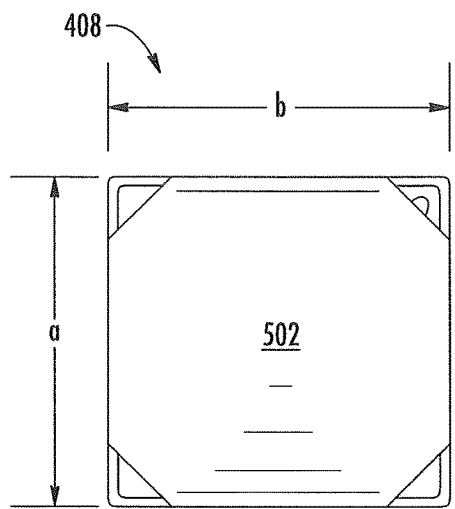
FIG. 9A and FIG. 9B are top and side views, respectively, of an LED device package that may be used with embodiments of the present invention.
Figure 9B:
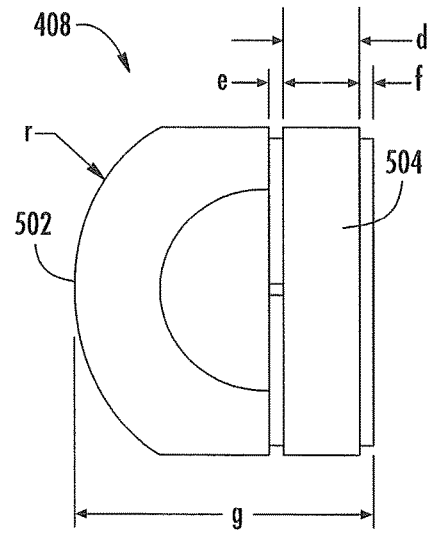

FIGS. 9A and 9B are a top view and a side view, respectively, of LED device package 408 from FIG. 8, that is, an LED device package with a domed lens. LED device package 412 would have the same dimensions. As previously mentioned, dimensions a and b are approximately 1.6 mm. The top part of domed lens 502 has a radius r of approximately 0.936 mm. The thickness d of submount 504 is approximately 0.375 mm, and the submount has metal layers on the top and bottom having thicknesses e and f of approximately 0.063 mm. Finally, the overall height g of device package 408 (and device package 412) is about 1.44 mm. It should be noted that domed lens 502 may be referred to as a "truncated" dome since the sides of the lens are flat.

Figure 10A:
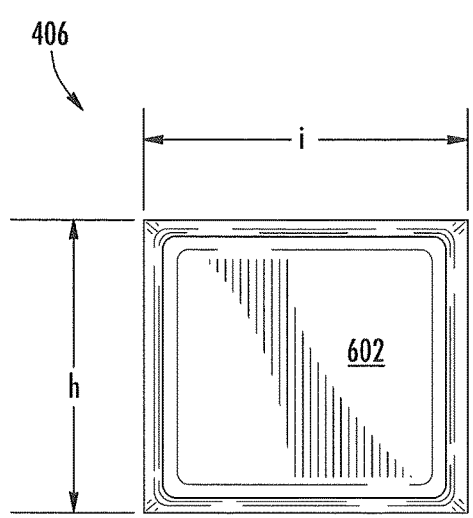
FIG. 10A and FIG. 10B are top and side views, respectively, of another LED device package that may be used with embodiments of the present invention.
Figure 10B:
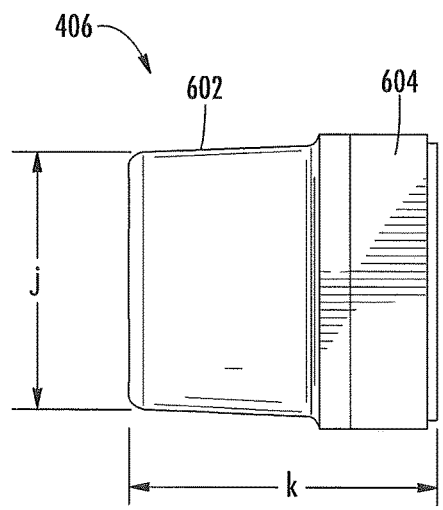

FIGS. 10A and 10B are a top view and a side view, respectively, of LED device package 406 from FIG. 4, that is, an LED device package with a cubic lens 602. Note that the lens does not form a perfect cube, or even part of a perfect cube as the sides are slightly tapered. The term "cubic" is used herein only to refer to the general shape, namely that having a flat top as opposed to a curved top. Also note that LED device package 410 would have the same dimensions. As previously mentioned, dimensions h and i are approximately 1.6 mm. The thicknesses of submount 604 and its metal layers are approximately the same as for the domed device package already discussed. The upward taper of the cubic lens 602 of LED device packages 406 and 410 cause the width j of the top of the lens to be less than the footprint dimension of the device. In this example the width j of the top of the lens is about 1.41 mm. The overall height k of device package 406 (and device package 410) is about 1.6 mm. LED device packages like those above can be realized with XQ series LEDs manufactured by Cree, Inc. in Durham, N.C., USA.

As can be readily observed, the LED devices package described above have differently shaped lenses, also referred to as primary optics. It has been found that the ability to "tune" the angle of light entering the guide optic with device package lens geometry allows for achieving an appropriate light distribution pattern from the lamp given engineering trade-offs that may result from the use of various materials and shapes for the optical elements. In the particular example above, the domed device package, with a first primary optic that is dome-shaped, emits light over a narrower angle of about 115° to about 120°. This angular pattern can be referred to herein as a first far field pattern. The cubic package, with a second primary optic that is roughly cubic in shape, emits light over a wider angle, from about 135° to about 140°. This wider angular pattern can be referred to herein as a second far field pattern. The combination of light within the secondary optic (optic element 200) having these two different angular emission patterns results in even lighting from the lamp. That is, light will evenly distributed around the sides and over the top of a lamp, more closely mimicking the light pattern of a traditional, incandescent bulb. A designer can "tune" the design of the lamp by using primary optics with different far field patterns by applying the each type of primary optic to LEDs of the same spectral output or across LEDs with differing spectral outputs, and those spectral outputs can be produced by phosphor conversion and/or by saturated, single-color LEDs. It is also possible to use LEDs of three or more differing spectral outputs and primary optics of more than two different far field patterns to obtain various results.

Figure 11:
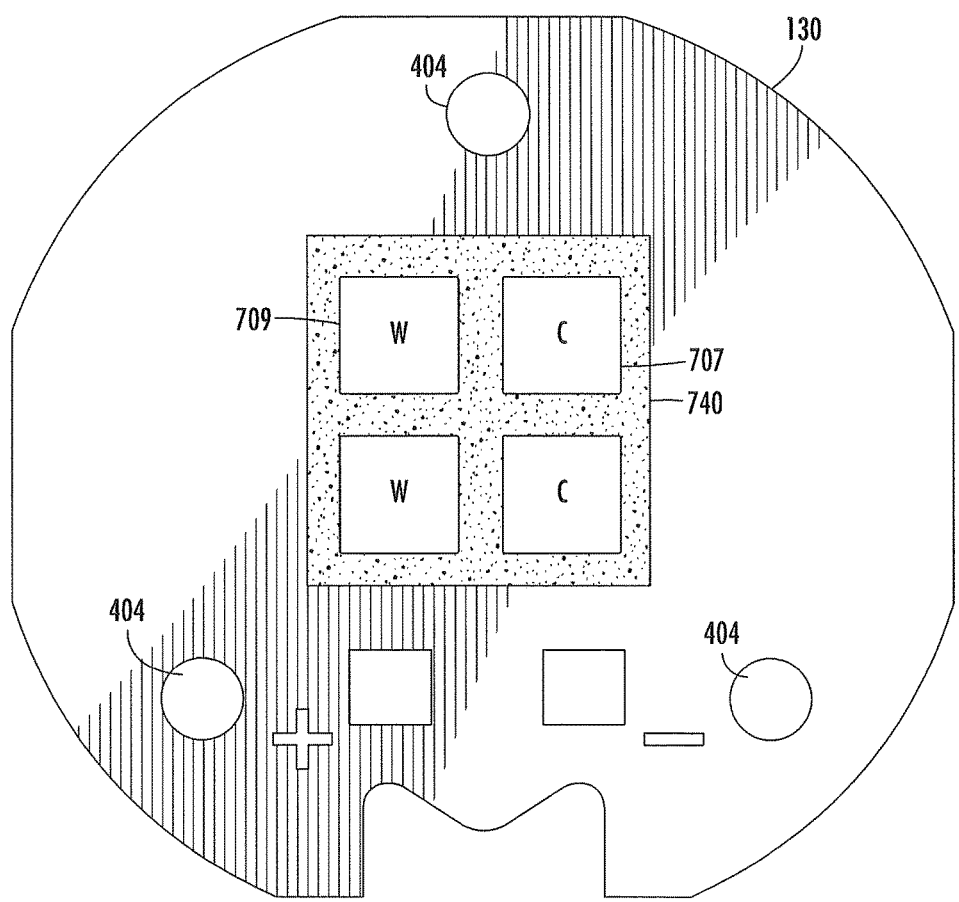
FIG. 11 is a top view of LEDs on the mounting surface of a circuit board with reflective material between and around the LED device packages according to example embodiments of the present invention.

FIG. 11 is a top view of circuit board 130 on which LED device packages are mounted under the optic element 200 to serve as a light source for a lamp. Four LED device packages are installed on circuit board 130. Circuit board 130 includes mounting holes 404 and power pads as indicated with plus and minus signs. In the embodiment of FIG. 11 however, larger LED device packages having a measurement of about 3 mm on a side are used, and these packages have identical optics, although larger packages with differing primary optics as previously described could be used. In this example embodiment, the cooler LED devices 707 emit light with a CCT of 3200K and the warmer LED devices 709 emit light with a CCT of 2200K. The LEDs have a space between them of from 0.4 to 1 mm, so that the footprint in this example is from 6.6 mm to 7 mm. In some embodiments, a lamp using an arrangement like that pictured in FIG. 11 has reflective material between and/or around the plurality of LED chips within the LED device packages. This reflective material can include material 740, which in some embodiments is a white or otherwise reflective solder mask. Alternatively, or in addition, LED devices 707 and 709 may include additional white or otherwise reflective material through the use of a reflective structural component. Such a reflective structural component can as an example include the package sidewalls, either by way of a coating or by use of a reflective submount, such as one made of alumina. It has been found that reflective material in the area of the LED chips improves the light output of a candelabra bulb according to embodiments of the invention. The reflective material may be specular or diffuse. In some embodiments the material has a reflectivity of at least 85%. In some embodiments, the material has a reflectivity of at least 90%. It has been found that with Cree XHG LEDs, a white solder mask encroaching on the LED device packages improves the light output of a lamp according to embodiments of the invention by eliminating dark recesses that could otherwise absorb light. A package with highly reflective interior and exterior surfaces (aka walls) can be used, where the high reflectivity of the external surfaces serves to reduce the loss from light impinging on it from neighboring LED packages and reflections from secondary optic surfaces. In a dense-packed geometry as described here, there is a significant amount of light that circulates throughout the volume and optical lose can be prohibitively high if the elements are not highly reflective (where the elements include the LED packages themselves as well as the printed circuit board, etc.).

In some embodiments, the reflective material 740 can be or include a reflective dam installed or deposited between and/or around the LED device packages. Such an embodiment is useful for LED device packages with dark submounts. The reflective dam may be made of solid plastic, raised metallization, or a white, silver or otherwise reflective material deposited around the LED device packages. The reflective dam may be designed so that the material resides only between the device packages, only around the device packages, or in both areas. In example embodiments, the reflective dam is composed of titanium dioxide and is deposited both in and around the LED device packages. It has been found that with Cree XQ series LEDs, that titanium dioxide in the area of the LED device packages improves the light output of a candelabra bulb according to embodiments of the invention.

Figure 12:
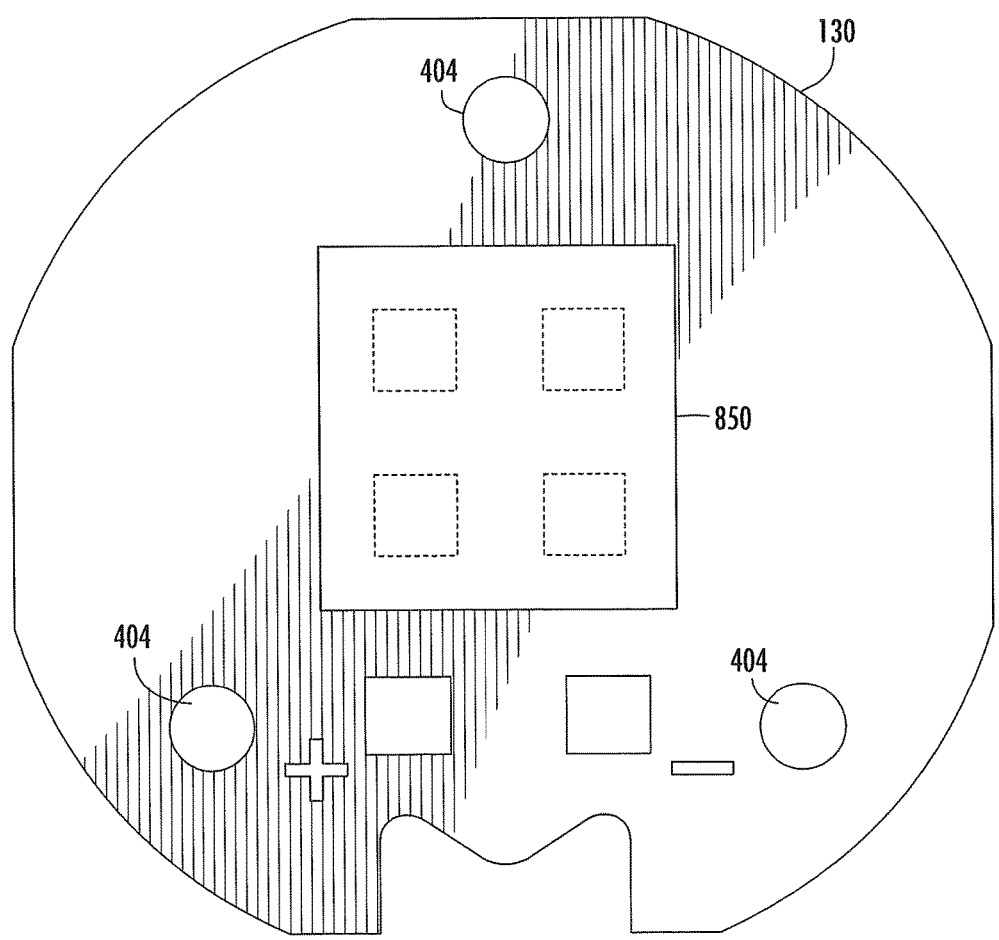
FIG. 12 is a top view of a single LED on the mounting surface of a circuit board within the lamp of some embodiments of the present invention.

FIG. 12 is a top view of circuit board 130, on which an LED device package with multiple, individually controllable spectral outputs can be mounted under a guide optic and serve as a light source for a lamp, such as the lamps shown and escribed herein. The figure is schematic in nature and may not be to scale. Circuit board 130 includes mounting holes 404 and power pads as indicated with plus and minus signs. As previously discussed, a lamp according to this example embodiment of the present invention has at least two differing spectral outputs. In some embodiments, a plurality of LED chips is disposed in a single LED device package 850, and the package is wired so that LED chips are individually addressable. As before, the package should occupy a relatively small footprint for use in a small, decorative lamp as previously described. In this particular embodiment, the lamp has four LED chips in the device package, and their positions are roughly indicated by dotted lines. In some embodiments, LED 850 is an MEM series LED from Cree. As before, portion of the light from the LED chips travels through the optic element, and light can generally be emitted from a small lamp with a correlated color temperature of from 1200K to 3500K, depending on the CCTs of the LEDs used. In this example, cool LEDs cause the emission of light with a CCT of 3500K and warm LEDs cause the emission of light with a CCT of 2200K, both with a color rendering index (CRI) of 90. Phosphor on the chips or otherwise disposed in the LED device package may be used to render these colors from the LEDs. By disproportionate dimming of the light emitters relative to the CCT of their light, the color temperature of the light from the lamp can be reduced along with the light output when the lamp itself is dimmed. The mechanism for such dimming will be discussed below with reference to FIG. 13.

Still referring to FIG. 12, in some embodiments LED device package 850 includes a single, LED die with multiple, individually addressable color emitting regions. In such a case the device substrate the package are wired so that the spectral outputs produced are individually addressable. In some embodiments, these color emitting regions are implemented by multiple PN junctions formed on a single semiconductor substrate. One, some, or all of the PN junctions may have an area of phosphor associated with it to provide the desired spectral output. Again the positions of the emitting regions and phosphor, if present are roughly indicated by dotted lines. Regardless of whether individual LED chips or light emitting regions on a single substrate are being used, each LED PN junction, with its phosphor if present, can be described herein as a light emitter.

As is well known in the lighting arts, the color temperature of an incandescent light bulb changes as the bulb is dimmed. This change typically amounts to several hundred degrees K of color temperature. The specifics vary from one type of bulb to another, but as an example, a typical household incandescent "Edison" style bulb has a full illumination temperature of about 2700° K and dims to a warmer 2200° K at about 10% of full illumination. LEDs typically actually grow cooler in color temperature as drive current is reduced. Thus, simply dimming an LED light source in the same manner as an incandescent bulb produces an unnatural result with respect to color temperature change. Embodiments of the present invention produce a more natural warming of the color temperature of a lamp when the lamp is dimmed.

Figure 13:
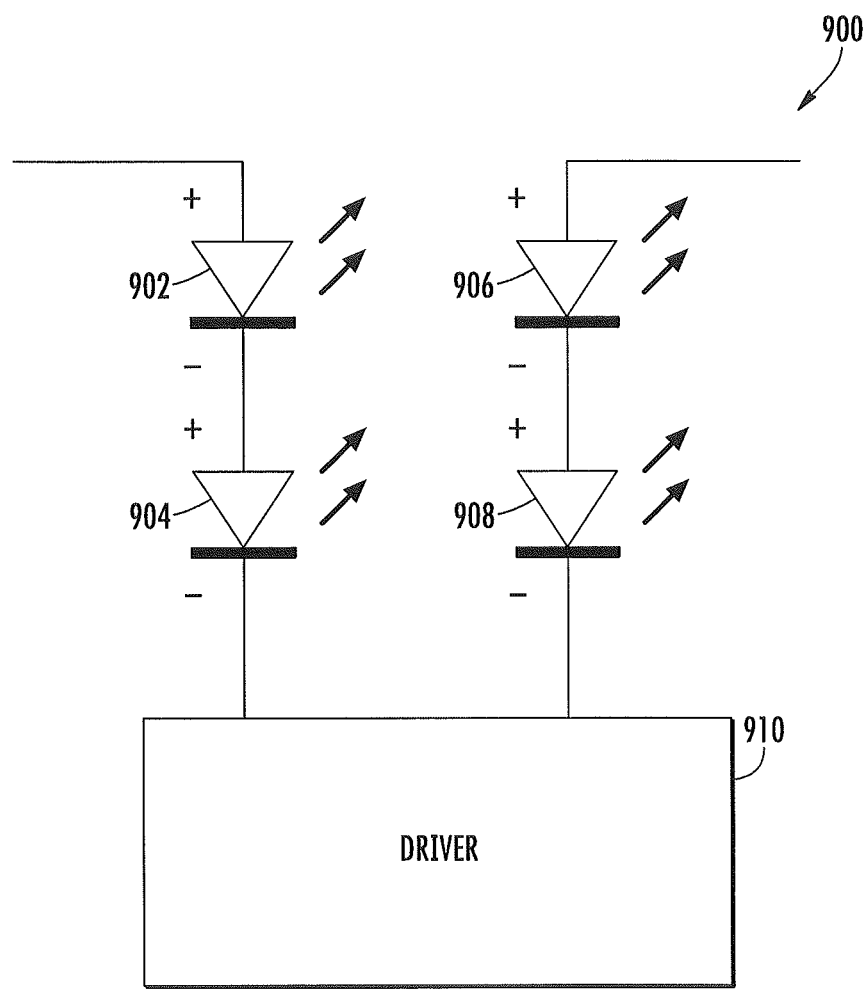
FIG. 13 is an electronic schematic diagram illustrating a portion of the circuitry of a lamp according to at least some embodiments of the present invention.

FIG. 13 illustrates the circuit configuration 900 that may be used in the example LED lamps described herein. Light emitters 902 and 904 are warm LEDs or addressable areas of a chip as previously described. Light emitters 906 and 908 are cool LEDs or addressable areas of a chip as previously described. Driver 910 individually addresses the two strings of light emitters. When the line voltage input (not shown) to driver 910 is reduced due to manipulation of a dimmer in the circuit, the driver reduces the drive current of the cool light emitters more so than the drive current of the warm light emitters. This disproportionate change in the drive current of the cool and warm strings of light emitters causes the overall light from the lamp to become warmer as the lamp is dimmed in much the same way that the color of light from an incandescent bulb warms when the bulb is dimmed. In example embodiments of the invention, 30 V light emitters are used in the LED device package or packages. Thus, each string is powered by 60 V. However, various types of LED devices can be used to implement an embodiment of the invention, including both lower and higher voltage LEDs.

Driver 910 of FIG. 13 includes the control circuitry to manage the disproportionate dimming of the LED strings; however, the control circuitry could be separated from the driver and, for example, mounted on the circuit board with the LEDs inside the lamp. The control circuitry can include, for example, a microcontroller that directs a separate driver circuit for each string of light emitters, possibly in accordance with feedback from an internal light sensor. In a candelabra LED lamp, at least most of the driver or power supply would normally be assembled within or conforming to the base of the lamp. The LED or LEDs is/are connected through the previously discussed circuit board to the power supply to be operable to provide the light of at least two different colors where the power supply selectively dims at least some of the light emitters when the lamp is dimmed through an architectural control in the same manner as an incandescent bulb would normally be dimmed. The guide optic receives some of the light and in part, along with the optically transmissive dome or enclosure, enables an omnidirectional, natural light pattern.

In example embodiments, light is emitted from the lamp with a correlated color temperature of from 1200K to 3500K that is reduced when the lamp is dimmed. A lamp can also operate at a color temperature from 2000K to 3000K, where the color temperature is reduced when the lamp is dimmed. In a specific example, the CCT of the light from the lamp is about 2700K and dims to about 2200K at 10% power, much the same as a typical incandescent bulb. This dimming profile is accomplished using LEDs with a spectral output having a CCT of about 2200K in combination with LEDs having a spectral output having a CCT of about 3200K, meaning the cooler light emitter is essentially shut off at full dimming. Various types of LED devices can be used and driving circuitry modified accordingly to alter these color temperatures.

The warmer and cooler LEDs or devices can be any of various spectral outputs. As additional examples, the spectral outputs with CCTs of 1800K and 2700K can be used. A lamp with such devices may produce generally warmer light at full brightness and would then become warmer still when dimmed as described herein. Single colors and non-phosphor converted colors can also be used. For example, a red LED device can be used with a substantially white LED device, wherein the light from the red LED device becomes a larger component of the output of the lamp when the lamp is dimmed. Additional single or saturated color LEDs can be added to fill-in portions of the light spectrum to make for more pleasing light or a higher CRI for the lamp. White light devices with spectral outputs having CCTs anywhere from 1200K to 5000K can be used together. As an example, a warmer LED might have a spectrum that runs from about 1200K to about 2700K, or be an appropriate single color or saturated color device and a cooler LED might have a spectrum that runs from about 2200K to about 5000K or be an appropriate single color or saturated color device. In some embodiments, a warmer LED might have a spectrum that runs from about 1200K to about 2200K, or be an appropriate single color or saturated color device and a cooler LED might have a spectrum that runs from about 2700K to about 3500K or be an appropriate single color or saturated color device.

In some embodiments, a lamp like that described in most respects can include 3, 4, or more LEDs or LED strings, where the LEDs of each string (even if a string only includes a single LED) have different spectral outputs. Such an embodiment would allow for more finely tuned color changes when dimming or under different conditions. As an example LEDs with CCTs of 1800K, 2200K, 3200K, and 3600K can be used in an embodiment based on four different spectral outputs. Such an arrangement can be used, as an example to create a very reddish low candlelight color when moving from 2200K to 1800K during the dimming process.

Figure 15:
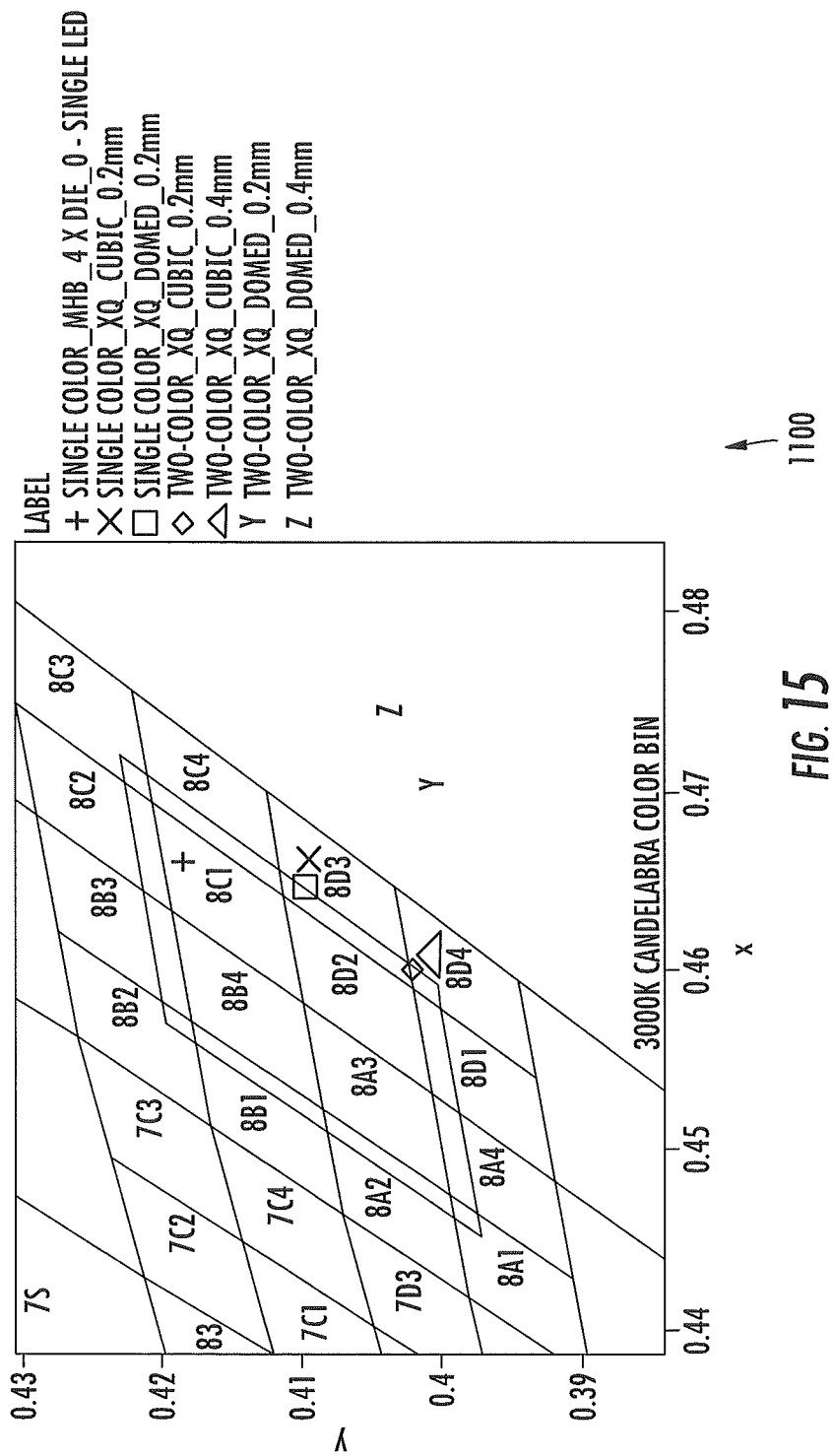
FIG. 15 is a color bin diagram for the LED lamp configurations referred to in FIG. 10.
Figure 17:
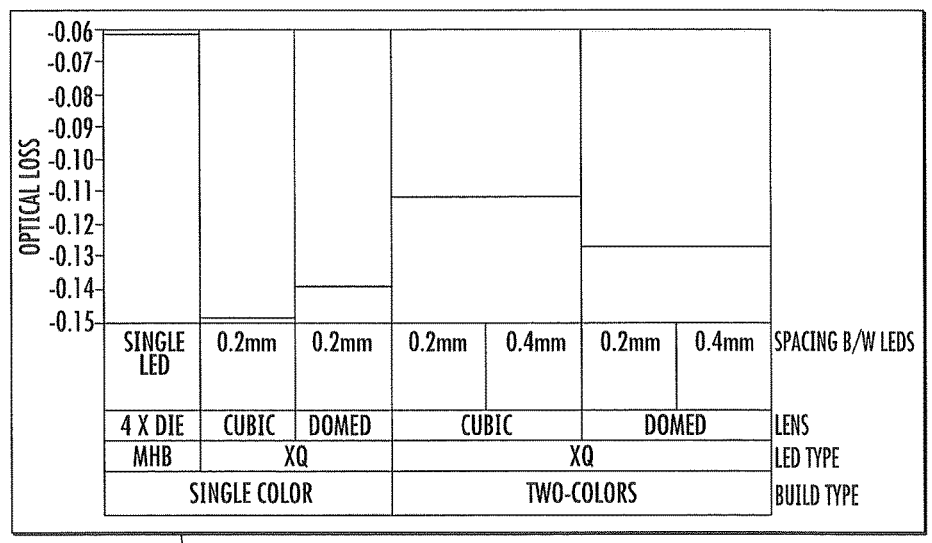
FIG. 17 is a graph showing the optical loss for various configurations of an LED lamp according to example embodiments of the invention.

FIG. 14 is a graph 1000 illustrating the efficiency and an LED candelabra bulb physically like that illustrated in FIGS. 1-3. The spacings for which data are shown refer to alternate spaces between device packages of 0.2 mm and 0.4 mm. The first column shows efficiency in lumens per watt (LPQ) for an MHB series LED with four chips in a single device package and the next column is for a lamp with four XQ series LEDs of a single color. The next columns illustrate efficiencies for devices making use of 2200K and 3200K LEDs together. FIG. 15 shows a color space diagram 1100 for the same configurations illustrated in efficiency graph 1000 of FIG. 14. FIG. 16 is an efficiency graph 1200 much like that shown in FIG. 14, except for the case where the guide optic has been removed so that the lamp is constructed with LEDs on the mounting surface beneath the optical enclosure with no optical tower to further distribute the light. Finally, FIG. 17 shows an optical loss diagram 1300 for the same lamp configurations for which efficiency is shown in FIG. 16. The loss shown represents that caused by the guide optic with the optical tower.

A lamp according to any of the above or other embodiments can be assembled by assembling a power supply within the base of the LED lamp, connecting an LED or LEDs to the power supply, connecting an optically transmissive enclosure to the base of the LED lamp to enclose the at least one LED, and installing a distribution optic in or on the base so as to serve as a light pipe by conducting light from the at least one LED for angularly distributed emission from the base of the LED lamp. As part of connecting the LED to the power supply, appropriate supports and circuit boards as previously described can be installed and connected. The various portions of a solid-state lamp or lighting system according to example embodiments of the invention can be made of any of various materials. Heatsinks can be made of metal or plastic, as can the various portions of the housings for the components of a lamp. A system according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Example embodiments of the present invention provide for improved luminous intensity distribution in the vertical plane (a plane in which axis A-A is located) for a vertically oriented solid-state lamp with a power supply or driver in the base. The phrase, "vertically oriented" is used for reference only. The lamp according to example embodiments of the invention can be oriented in any direction and the advantages discussed herein will be equally realized. As previously mentioned, an embodiment of the invention can find use in a lamp of any form factor or shape; however, embodiments of the invention can be especially useful in SSL bulbs dimensioned to replace elongated incandescent bulbs where the width of the top of the optical dome is equal to or narrower than the width of the base, such as candelabra bulbs. Lamp 100 as shown in FIG. 1 includes an optical enclosure 112 covering the LEDs, an opaque driver base 105, and an Edison-style screw connector 103. Note that since driver base 105 is opaque and includes the power supply, no light emanates from that part of the bulb. Thus, when viewed at a distance, LED lamp 100 does not give off light in all directions and looks quite different than a traditional incandescent candelabra bulb.

FIGS. 18 through 21 show various views of an LED lamp 1400 according to another example embodiment of the invention. FIG. 18 is a side view of lamp 1400. Lamp 1400 is dimensioned as a replacement for a candelabra-style incandescent bulb and includes optically transmissive enclosure 1412, driver base 1402 and an Edison-type screw connector 1403. Driver base 1402 includes a power supply to provide the correct voltage and current to drive the LED or LEDs that serve as light sources for solid-state lamp 1400, receiving line voltage as input through the Edison-type screw connection as previously described. It should be noted that any type of electrical connection could be used in a solid-state replacement bulb according to example embodiments of the present invention. In the case of lamp 1400, light is emitted from driver base 1402 along with the light from the optically transmissive enclosure 1412. Thus, lamp 1400 can be said to include a driver base 1402 and an optically transmissive enclosure 1412 connected to the base 1402, where, when viewed at a distance, the LED lamp gives off light in substantially all directions in the vertical plane, and thus looks like a traditional incandescent candelabra bulb. It should be noted that the optically transmissive enclosure 1412 and the base 1402 can be made as distinct parts or components, or they can be molded, extruded, or otherwise made together as one piece.

Figure 19:
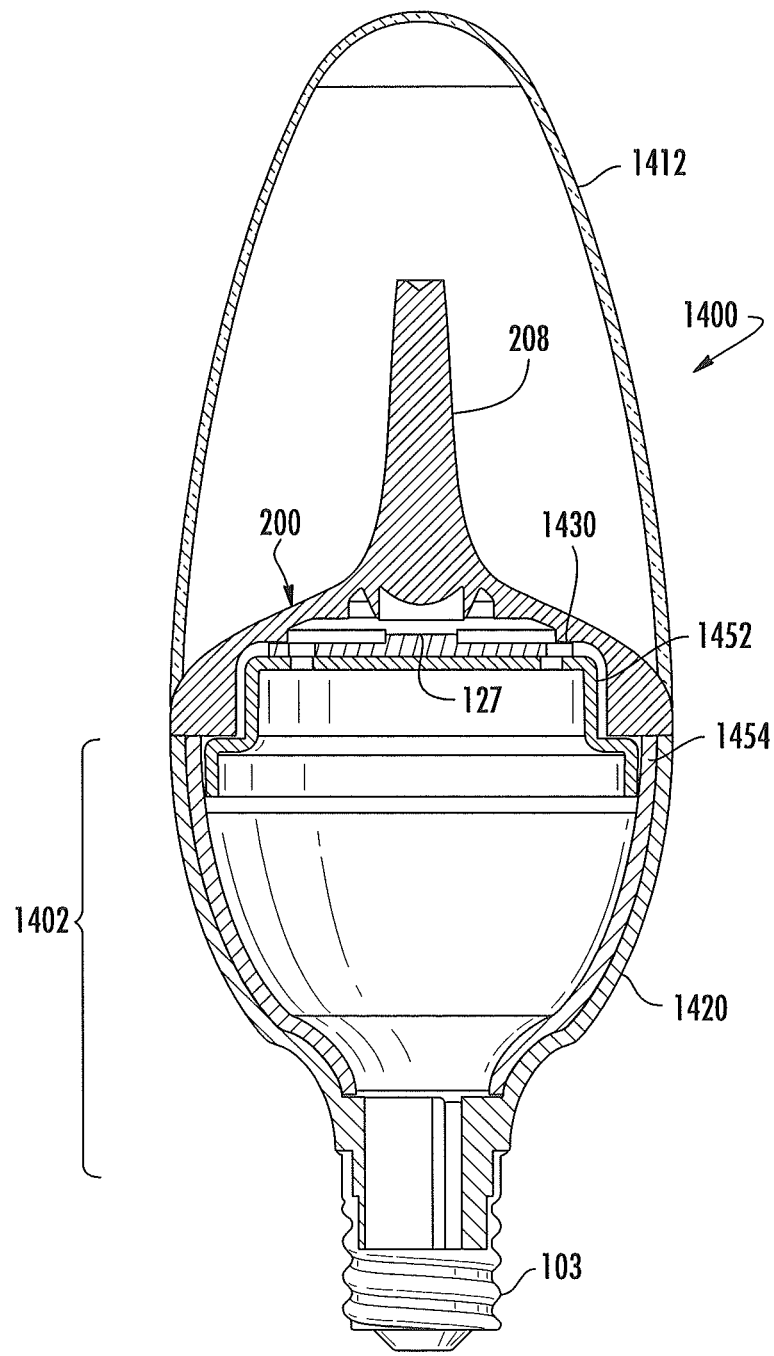
FIG. 19 is a section view of the LED lamp of FIG. 18.

FIG. 19 is a section view of solid-state lamp 1400 with the power supply components removed from power supply shell 1454. The base of lamp 1400 as visible in FIG. 19 and FIG. 20 includes support 1452 and circuit board 1430, on which an LED 17 is mounted. Bulb 1400 includes an angular distribution optic 1420 conformably disposed in or on the base. This distribution optic 1420 can be translucent or transparent, and can be formed from an optical medium such as rigid plastic or a material that is sprayed, molded in place, or otherwise similarly applied to the base. In example embodiments the optical medium, regardless of the material can be on average, from 1 mm to 5 mm thick, and is conforming to the general shape of the base.

Figure 20:
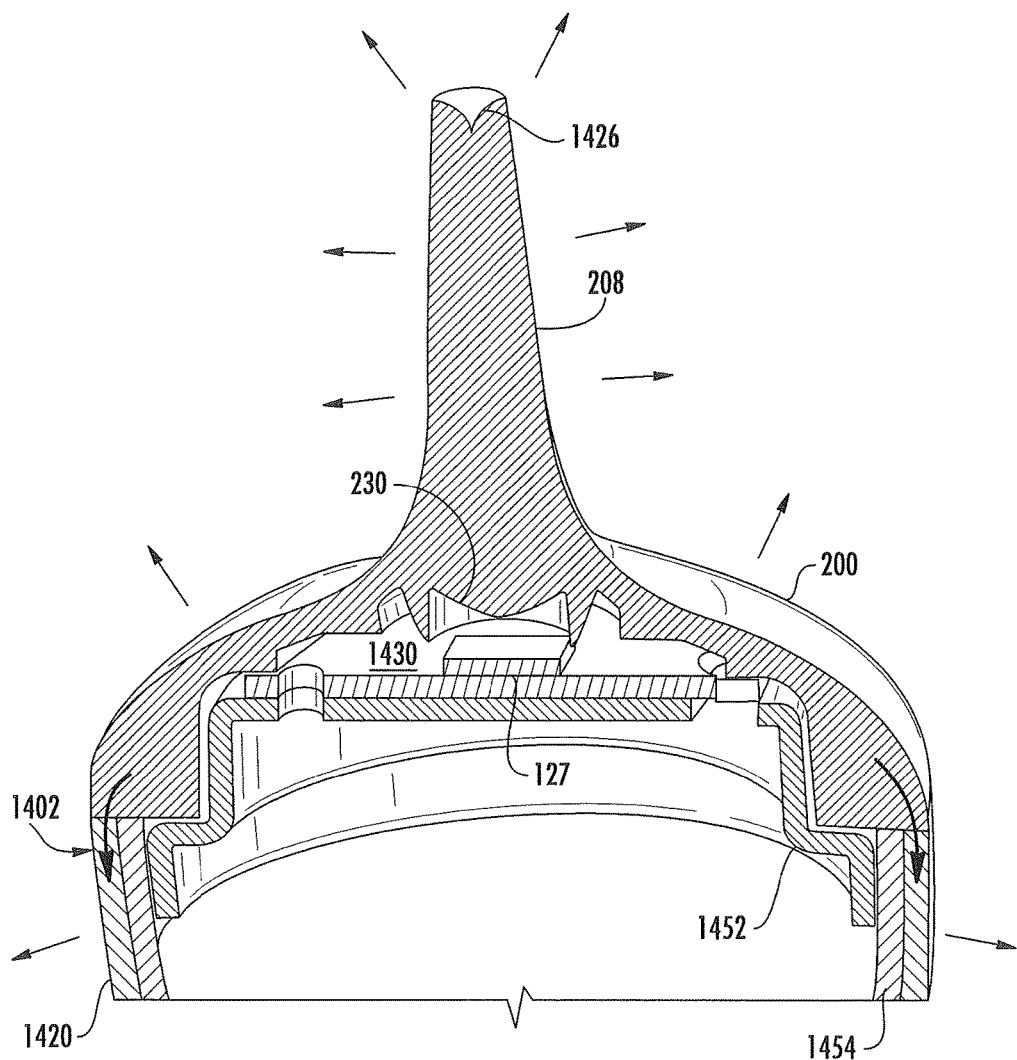
FIG. 20 is a perspective section view of the lamp of FIG. 18 with the optically transmissive enclosure removed.

Still referring to FIG. 19 and FIG. 20, lamp 1400 also includes an optic element 200 transmissively coupled to the distribution optic 1420 and arranged to direct light from the LED device package into the distribution optic 1420, as indicated by the arrows from the optic element 200 to the distribution optic 1420 shown in FIG. 20. The optic element 200 also directs light into the optically transmissive enclosure 1412. Light emanates from the distribution optic 1420 around the base of the bulb, in addition to from the top portion of the optic element 200 and out through optically transmissive enclosure 1412, resulting in a natural, pleasing light pattern, especially for a candelabra bulb, which may be installed in an open or transparent fixture.

Optic element 200 in this example embodiment is a total-internal-reflection (TIR) optic. The vertical part or stem 208 of optic element 200 in this example embodiment is tapered, and includes internally reflective surfaces 1426 at the top end. Entry surface 230 directs light rays as appropriate to exit the optic at the top and sides to direct light into optically transmissive enclosure 1412 and eventually emanate from the top portion of the bulb.

Continuing with FIG. 19 and FIG. 20, a reflective shell 1454 in this example is installed between the distribution optic 1420 and the power supply. In some embodiments the shell 1454 insert is made of a thermally conductive material such as metal such as aluminum; however other materials could be used. The insert could have a surface that is specular or diffusive. A diffusive insert could be made of highly reflective white plastic for example. Either or both of the reflective insert and the distribution optical medium could be made thermally conductive to aid in cooling the electronics in the base of the bulb. As an example, incorporating a thermally conductive additive into translucent plastic material can produce thermally conductive plastic.

Figure 21:
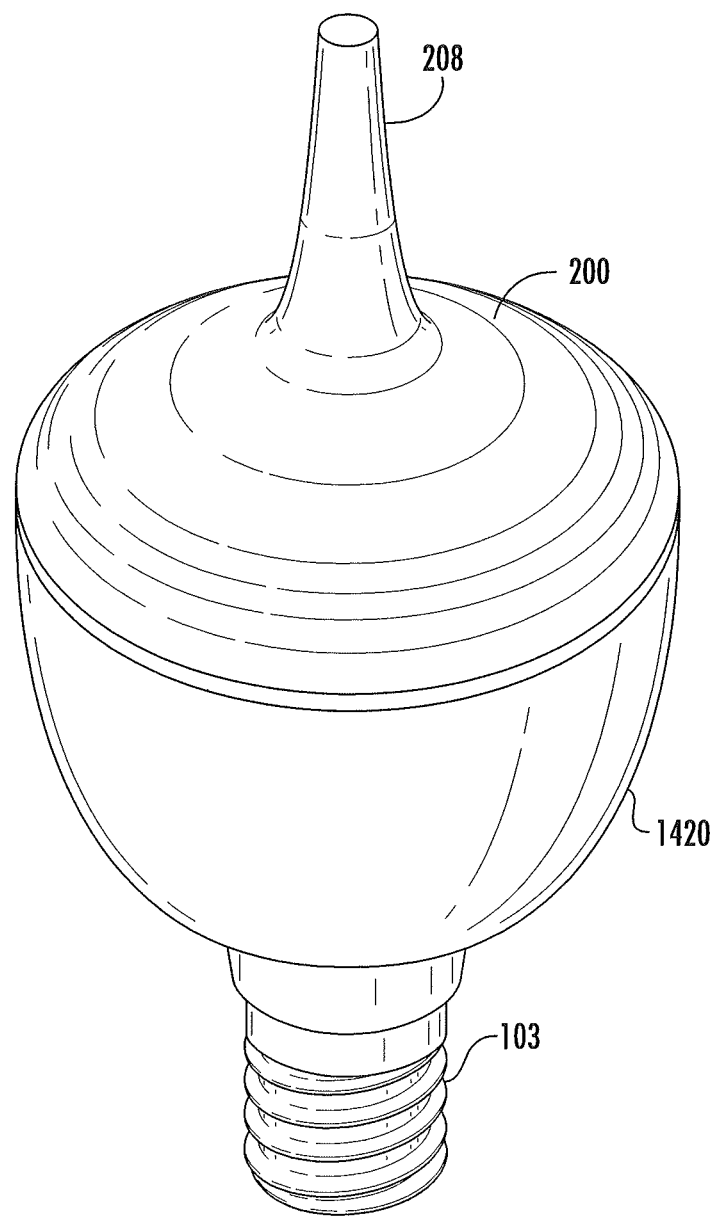
FIG. 21 is a perspective view of the lamp of FIG. 18 with the optically transmissive enclosure removed.

FIG. 21 is a perspective view of the entire base of the candelabra lamp of FIG. 18 so that the overall shape of the optic element 200 in this example embodiment is visible. Note that in this case substantially all light conducted into the distribution optic 1420 is supplied by the optic element 200. The optically transmissive enclosure 1412 can be fastened with adhesive or fasteners on top of the optic element 200, and can be designed so that the edges that rest on the guide optic are angled and are either light transmissive or opaque. If the edges of the optically transmissive enclosure 1412 are light transmissive the optically transmissive enclosure may be indirectly transmissively coupled into the distribution optic. It is possible to design the distribution optic 1420 so that the optically transmissive enclosure 1412 also or alternatively directly pipes light into the distribution optic 1420 and such an embodiment is described below with respect to FIG. 22.

LED 127 as shown in the figures can include a single LED, but more typically includes multiple LED chips or "LEDs" on a submount as previously described. Such a device is often referred to as an "LED" even if it in fact includes multiple LED chips. These can be so-called "flip-chip" LEDs or have a more conventional design with wire bonds making some or all electrical connections. Some or all of the LED chips can include a conformal phosphor layer. Alternatively, a lens or clear cover for the device package can include a phosphor layer. In some example embodiments, the phosphor layer's thickness is less than half the spacing between adjacent die. The combination of LEDs and phosphor are designed to emit substantially white light, or light with a color temperature similar to that of incandescent bulbs as might be desired. A submount in the device is typically covered with a pattern of metal to interconnect the LEDs if necessary and provide a connection to the power supply. Other components, such as ESD protection diodes may be present on the submount. Submounts for such devices may be made of alumina, aluminum nitride, or other materials, for example high-temperature polymers.

Figure 22:
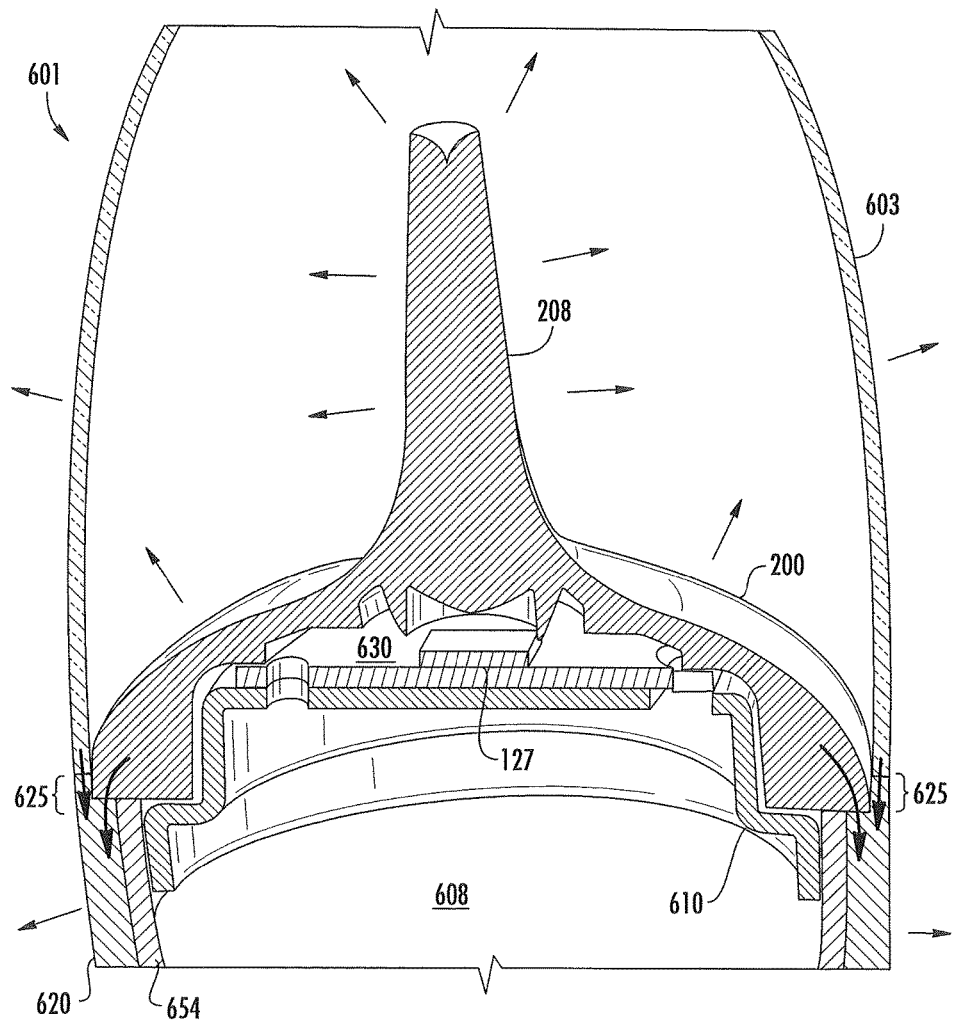
FIG. 22 is a detailed perspective section view of the lamp of FIG. 18.

FIG. 22 is a partial section view of an LED lamp 601 according to additional example embodiments of the invention. Lamp 601 is again dimensioned as a replacement for a candelabra-style incandescent bulb and includes optically transmissive enclosure 603 and a driver base with an Edison-type screw connector (not shown). The arrows emanating from the bulb and optic element 200 indicate the emission of light. Again, light is emitted from the driver base along with the light from the optically transmissive enclosure 603. Thus, when viewed at a distance, LED lamp 601 again gives off light in substantially all directions in the vertical plane, and thus looks like a traditional incandescent candelabra bulb.

Still referring to FIG. 22, the base of bulb 601 includes support 610 and circuit board 130, on which an LED 127 is mounted. Bulb 601 includes a distribution optic 620, again conformably disposed in or on the base. This distribution optic 620 again can be translucent or transparent, and can be formed from an optical medium such as rigid plastic or a material that is sprayed, molded in place, or otherwise similarly applied to the base. In example embodiments the optical medium, regardless of the material can be on average, from 1 mm to 5 mm thick, and is conforming to the general shape of the base. However, note that in this case, the distribution optic has a step 625, in or on which both the optic element 200 and the optically transmissive enclosure 603 rest. That is, the optic element 200 is arranged to direct light from the LED 127 into the distribution optic 620, as indicated by the arrows from the optic element 200 to the distribution optic 620, but the enclosure 603 is also arranged to direct light from the LED 127 into the distribution optic 620, as indicated by the arrows from the optically transmissive enclosure 603 to the distribution optic. Light then emanates from the distribution optic 620 around the base of the bulb, in addition to from transmissive enclosure 603, resulting in a natural, pleasing light pattern, especially for a candelabra bulb, which would often be installed in an open or transparent fixture.

Continuing with FIG. 22, optic element 200 in this example embodiment is again a total-internal-reflection (TIR) optic, but the base of the guide optic may have a smaller diameter to allow space for the step 625 and the optically transmissive enclosure. The vertical part or stem 208 of optic element 200 in this example embodiment is again tapered, and includes similar internally reflective surfaces as previously described. It should be noted that the optic element 200 can be made even smaller and not couple any light into the distribution optic 620. In such a case, the optically transmissive enclosure 603 couples light into the distribution optic 620 exclusively or almost exclusively. One of skill in the art can alter the size of step 625 or the width of the various edges to achieve balance between light piping mechanism as required or desired for a particular bulb design.

As before, lamp 601 of FIG. 22 can include a reflective internal shell 654 installed between the distribution optic 620 and the power supply. In some embodiments this insert is made of aluminum; however other materials could be used. The insert could have a surface that is specular or diffusive. A diffusive insert could be made of highly reflective white plastic for example. Again, either or both of the reflective insert and the distribution optical medium could be made thermally conductive to aid in cooling the electronics in the base of the bulb.

Figure 23:
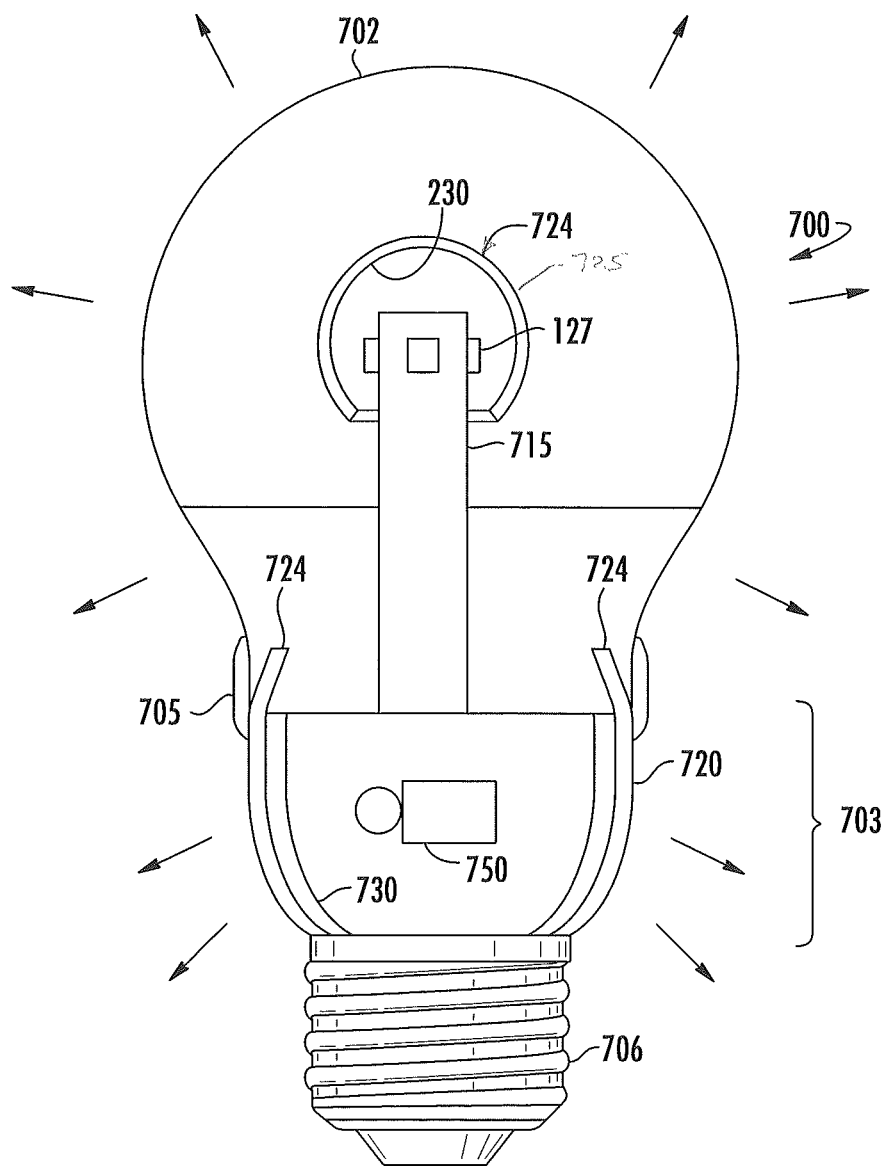
FIG. 23 is a schematic side view of a solid-state, LED lamp having a form factor of an A-series lamp according to other embodiments of the present invention.

FIG. 23 is a cut-away side view of an A-series style SSL LED lamp 700 that makes use of an embodiment of the invention. Lamp 700 includes optically transmissive enclosure 702 and driver base 703, with Edison screw connector 706. This particular style of lamp includes a heatsink having fins 705 that is thermally coupled to the LEDs 127. In this particular example embodiment, the optic element 724 receives light from LEDs 127 at entry surface 230. Optic element 724 may have a different shape than the optic element 200 previously described herein because LED devices 127 are located on filament tower 715 and provide omnidirectional light within the optical enclosure. Entry surface 230 may be provided with tangential refracting surfaces as described herein. In this example embodiment, a distribution optic 720 may or may not be used on base 704. Where the distribution optic is not used base 703 may be non-light transmitting and may be constructed in the same manner as base 102 of FIGS. 1-5. The distribution optic 720 may be translucent or transparent, and can be formed from an optical medium such as rigid plastic or a material that is sprayed, molded in place, or otherwise similarly applied to the base. Arrows emanating from the bulb indicate the emission of light. In example embodiments the optical medium of distribution optic 720, regardless of the material, can be on average, from 1 mm to 5 mm thick, and is again conforming to the general shape of the base. Also in this example embodiment, guide optic 724 pipes light into the distribution optic. In this example, guide optic 724 is an annular light pipe.

Still referring to FIG. 23, lamp 700 may include a reflective inner shell 730 installed between the distribution optic 720 and the power supply 750. In some embodiments this insert is made of aluminum; however other materials could be used. The insert could have a surface that is specular or diffusive. A diffusive insert could be made of highly reflective white plastic for example. Again, either or both of the reflective insert and the distribution optical medium could be made thermally conductive to aid in cooling the electronics in the base of the bulb.

A lamp according to any of the above or other embodiments can be assembled by assembling a power supply within the base of the LED lamp, connecting an LED or LEDs to the power supply, connecting an optically transmissive enclosure to the base of the LED lamp to enclose the at least one LED, and installing a distribution optic in or on the base so as to serve as a light pipe by conducting light from the at least one LED for angularly distributed emission from the base of the LED lamp. As part of connecting the LED to the power supply, appropriate supports and circuit boards as previously described can be installed and connected. The various portions of a solid-state lamp or lighting system according to example embodiments of the invention can be made of any of various materials. Heatsinks can be made of metal or plastic, as can the various portions of the housings for the components of a lamp. A system according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

With respect to the features of the LED assembly and related electronic described herein with various example embodiments of a lamp, the features can be combined in various ways. For example, the various methods of including phosphor in the lamp can be combined and any of those methods can be combined with the use of various types of LED arrangements such as bare die versus encapsulated or packaged LED devices. The embodiments shown and described herein are examples only and are intended to be illustrative of various design options for a LED lighting system.

LEDs and/or LED packages used with embodiments of the invention and can include light emitting diode chips that emit different hues of light that, when mixed, are perceived in combination as white light. Phosphors can be used as described to add yet other colors of light by wavelength conversion. For example, blue or violet LEDs can be used in the LED assembly of the lamp with the appropriate phosphor. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light. LED 127 may be individually encapsulated, each in a package with its own lens. Such embodiments can produce light with a CRI of at least 70, at least 80, at least 90, or at least 95. In one embodiment the lamp described herein produces a CRI≥90 and a R9 value≥40.

A lighting system using the combination of BSY and red LED devices referred to above to make substantially white light can be referred to as a BSY plus red or "BSY+R" system. In such a system, the LED devices used include LEDs operable to emit light of two or more different colors. A further detailed example of using groups of LEDs emitting light of different wavelengths to produce substantially while light can be found in issued U.S. Pat. No. 7,213,940, which is incorporated herein by reference.

The term "electrical path" can be used to refer to the entire electrical path to the LED, including an intervening power supply disposed between the electrical connection that would otherwise provide power directly to the LEDs and the LEDs, or it may be used to refer to the connection between the mains and all the electronics in the lamp, including the power supply. The term may also be used to refer to the connection between the power supply and the LEDs.

Figure 24:
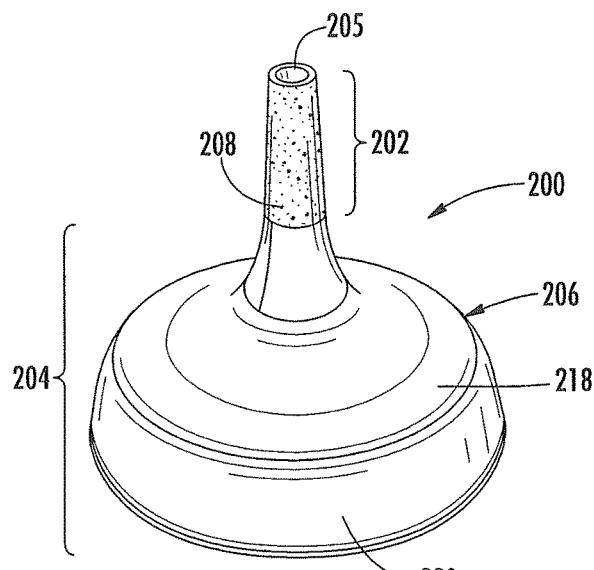
FIG. 24 is a perspective view of an optic element according to embodiments of the present invention.
Figure 25:
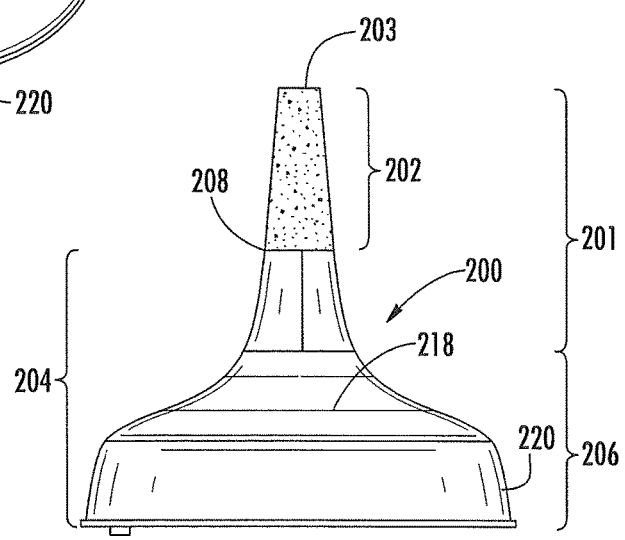
FIG. 25 is a side view of the optic element of FIG. 24.
Figure 26:
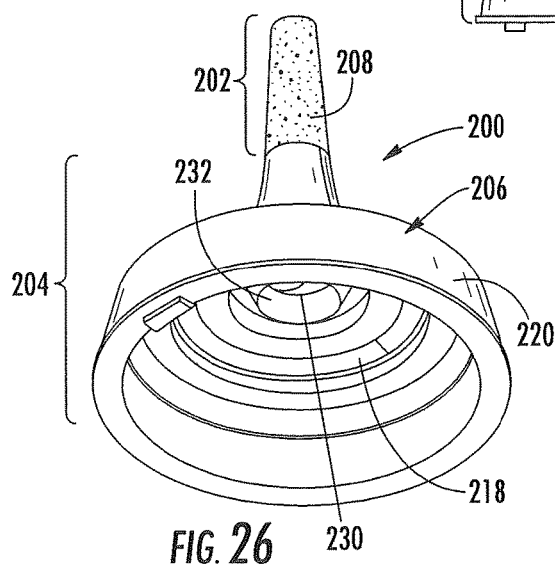
FIG. 26 is another perspective view of the optic element of FIG. 24.

Referring more particularly to FIGS. 24-26, the optic element 200 may be configured such that the light received from the LED 127 is emitted in a pattern that visually appears similar to or that mimics the light as it appears from the glowing filament of a traditional incandescent bulb. The optic element may be made of a transparent material with a light transmission ≥90% such as Poly(methyl methacrylate) (PMMA). Light is transmitted along the length of the optic element 200. The optic element 200 may use total internal reflection to transmit the light along the length of the optic element. The optic element comprises a relatively wide base 206 and a relatively narrow, elongated stem 208 that extends from the base. The optic element may be generally cylindrical in shape. The optic element 200 comprises a light emitting portion 202 that defines the "filament portion" of the optic element 200 that emits and diffuses the light from the optic element 200. The light emitting portion 202 may be formed as part or all of the relatively narrow stem 208. In some embodiments approximately the top half of the stem 208 adjacent the distal end 203 may comprise the light emitting portion 202 while in some embodiments the top third of the stem adjacent the distal end 203 may comprise the light emitting portion. In other embodiments the light emitting portion may be spaced from the distal end 203 of the stem. A dimple or recess 205 may be formed in the end face of the stem 201. The dimple reduces shadow at the distal end of the lamp to create a more uniform far field pattern. The dimple may be formed as a concave cone. The light emitting portion 202 may comprise a notched, roughened or irregular surface, or other surface treatment (represented by the dotted area in the Figures) that causes the light to be emitted from the optic element 200 in random directions such that the light undergoes diffusion or scattering. The surface treatment of the light emitting portion 202 may be provided by scratching, etching or otherwise treating the optic element 200. Alternatively the surface treatment of the light emitting portion 202 may be provided during formation of the optic element 120 such as by creating a micro-pattern during a molding process of the optic. The term "surface treatment" is used to mean a configuration of the light emitting portion 202 of the optic element 200 that allows light to be refracted and transmitted across a boundary such that the light is transmitted from the optic element and typically includes light scattering or diffusing properties. The "surface treatment" may comprise "surface indentations" where the "surface indentation" means a treatment of the optic element that creates surface irregularities that cause light to be emitted from the optic element such as etching, roughening, molding of irregularities or the like.

The optic element 200 may also include non-light emitting portions 204 in those areas where less light is emitted from the optic element. The non-light emitting portions 204 may serve as light paths between the LED 127 and the light emitting portions 202 of the optic element 200 such that the light is more visible in the areas 202 that correspond to the illuminated filament in a traditional incandescent bulb. For example the non-light emitting portions 204 of the optic element 200 may not comprise the surface treatments described above.

Referring to FIG. 5, because of the relatively limited internal volume of a candelabra lamp as explained previously, in order to make a LED lamp having the form factor of a candelabra, a portion of the heat sink 149 and lamp electronics 110 extend from the base 102 beyond plane L-L and into the enclosure 112. The lamp is configured such that the internal cavity 113 for receiving the lamp electronics 110 extends beyond the lower end 112a of the enclosure 112 and to the opposite side of plane L-L from base 102. As shown in FIG. 5 at least an upper portion of the heat sink 149 extends beyond the upper end 105a of the base 105 and extends beyond line L-L and into the interior volume defined by the optically transmissive enclosure 112. The LED 127 and LED board 130 are supported on top of the heat sink 149 such that the LED 127 and LED board are disposed in the volume of the enclosure 112 to the side of plane L-L opposite base 102. As shown in FIG. 5 the LED 127 are located in the enclosure 112 approximately at plane P-P, or above plane P-P, to the side of plane P-P opposite base 102. The plane P-P is disposed substantially perpendicular to longitudinal axis A-A and parallel to plane L-L and is disposed to the side of plane L-L toward the distal end 112b of the lamp. The lamp electronics 110 including board 80 may also be on the opposite side of plane L-L from base 102 such that a portion of the lamp electronics 110 and/or board 80 may extend into the volume defined by the enclosure 112. Thus, the internal space 113 and lamp electronics may extend from the base side of plane L-L to the opposite enclosure side of plane L-L.

The optical element 200 is designed to extend over the sides of the LED 127 and at least the portion of the heat sink 149 that extends beyond plane L-L and into the volume defined by the enclosure 112. The optic element 200 comprises a first portion that extends to the first side of the plane P-P and a second portion that extends to the second side of the plane P-P.

In one embodiment the optic element 200 includes a first portion or base 206 that extends over and covers the components that extend into the volume defined by enclosure 112 and a second portion or stem 208 that extends into the center of the enclosure and that includes the light emitting portion 202 that corresponds to the glowing incandescent filament in a traditional incandescent bulb. In one embodiment, the base 206 is configured such that it extends from adjacent the lower end 112a of the enclosure 112 and encircles the upper portion of the heat sink 149, LED 127 and LED board 130 that extend into the volume defined by the enclosure 112. The second portion 208 may comprise a relatively long narrow member that extends along the longitudinal axis A-A of the lamp.

In one embodiment the upper portion of the heat sink 149 has raised platform 210 having a LED support surface 212 that is positioned to the side of plane L-L opposite base 102 for supporting the LEDs. In the illustrated embodiments the support surface 212 is disposed transversely to the longitudinal axis of the lamp substantially on the plane P-P; however, the support surface may have other orientations and may be located at any position at or above plane P-P. The heat sink 149 has a downwardly extending rim 208 that extends toward base 102. An annular flange 210a extends from the end of rim 208 that is configured and dimensioned to be closely received in the second portion of the heat sink 154 such that the platform 210 is centered in the enclosure 112 and is spaced from the enclosure such that an annular space 214 is provided that surrounds the platform 210. In the illustrated embodiment the platform 210 is formed by the first portion 152 of the heat sink. In other embodiments the platform 210 may be formed in other manners.

Referring again to FIGS. 24-26 the base 206 of the optic element 200 has a first surface 218 that extends over and covers the LED 127, LED board 130 and platform 210. A rim 220 extends from the first surface 218 that covers the support 152 and that fits into the annular space 214 formed between the support and the enclosure 112. The base 206 defines the bottom of the optically transmissive enclosure and divides the interior space of the enclosure 112 from the base 102. As is shown in the drawings the optic element 200 and the upper portion of heat sink 149 extend from the lower end 112a of the enclosure 112 and extend beyond line L-L into the interior space of the enclosure 112 to effectively increase the space available to house the LED 127, LED board 130, heat sink and lamp electronics 110. The arrangement described herein allows the size of the non-optically transmissive base 102 of the lamp to be reduced relative to the optically transmissive enclosure 112 such that the lamp of the invention provides a greater ratio of optically transmissive view space to non-optically transmissive base. By extending the optic element 200 and the enclosure behind the plane P-P of the LED 127, the joint between the optically transmissive enclosure 112 and the non-optically transmissive base 102 may be moved toward the base 103 behind the plane P-P of the LED 127 to thereby increase the ratio of optically transmissive view space to non-optically transmissive base. Because the optic element 200 is made of an optically transmissive material and the base of the optic element 200 extends to the end 112*a* of the enclosure 112, light may be projected from the optic element over the entire area of the enclosure 112 such that the extension of the interior space 113 into the enclosure 112 does not inhibit light emitted from the enclosure and does not create dark spots on the enclosure.

The stem or filament portion 208 of the optic element 200 extends into the center of the enclosure 112 such that the light emitted from the stem 208 glows to mimic the light pattern of an incandescent candelabra bulb. The stem 208 may have any suitable shape and may emit light in a variety of patterns. While the optic element has been described as a generally cylindrical member having a diameter, the optic element may be other than a cylinder such that the "diameter" of the optic element may be considered a transverse distance or width. The term "width" as used herein means a diameter in a cylindrical optic element and/or a transverse dimension in a non-cylindrical optic element. In one embodiment the stem 208 may have a width of approximately 3-5 mm. In one embodiment the stem 208 of the optic element 200 is formed as a relatively long, thin member that is disposed along the longitudinal axis of the lamp. The optic element 200 may be formed such that the stem 208 has a width of approximately 5 mm or less and in some embodiments may be 3-5 mm in diameter. The stem 208 may be formed with a slight taper where the light emitting portion has a width of approximately 5 mm or less at the distal termination end of the stem 208 where the stem gradually widens toward base 206. In one embodiment the stem 208 has a width of approximately 5 mm and a width of approximately 3 to 5 mm at the end of the light emitting portion 202. In some embodiments, the optic element 200 has an overall height of about 33-34 mm and the stem has a height of approximately 22 mm. In order to create the visual effect of a candelabra the height to width ratio of the stem may be at least 2:1. The height to width ratio may be between 2:1 and 8:1 and in one embodiment the ratio may be approximately 6.5:1. The height to width ratio of the stem may be at least 3:1, 4:1, 5:1 or the like. The distal end of the optic has a width of approximately 3-4 mm with the element tapering from a width of approximately 5 mm near the midpoint of the stem 208 to a width of approximately 3 mm at the distal end 203 of the optic element. The optic element may gradually increase in width from the distal end 203 to the base from approximately 3 mm to approximately 10-10.5 mm. The width of the base 206 may be approximately 32 mm. The stem 208 may narrow at an angle of 0-10 degrees with a preferred angle between 3 and 5 degrees and in one embodiment approximately 4 degrees. The width of the base 206 may be approximately three times, five times, six times or greater the width of the stem 208. The width of the base 206 may be approximately between three times and 10 times the width of the stem 208. The stem 208 may have a height of approximately between approximately 21 and 23 mm and in one embodiment approximately 22 mm. In some embodiments the height of the stem between the point of intersection with the base and the distal end of the optic element and the width of the stem at the distal end may have a height to width ratio of at least 3:1 and may approximately between 3:1 and 8:1 and in some embodiments may be approximately 7:1. These are just examples to illustrate exemplary dimensions and relative scale but other dimensions and the relationship between the dimensions may be different from those described with respect to specific embodiments. The use of a relatively long, narrow light emitting portion provides a visible light pattern that is similar to the visible light pattern in a fluorescent candelabra bulb. A LED based lamp as described herein emits light having a color temperature of between 1500K and 2700K. In other embodiments the color temperature may be between 2700K and 6500K.

The underside of the base 206 of the optic element 200 may have a light entry surface 230 for receiving light emitted by the LED 127. In one embodiment the LED 127 comprising a single light emitting surface as previously described and the light entry surface 230 are centered in the optical element. The use of a single light emitting surface is better able to couple to the optic element than multiple light emitting surfaces. In other embodiments multiple light emitting devices with multiple light emitting surfaces may be used where the entry surface 230 may be centered relative to the multiple light emitting devices. In some embodiments the width of the light emitting surface is the same or smaller that the width of the light entry surface 230. As used herein width means the largest transverse dimension of the component. For example, the width of the circular light entry surface 230 may be a diameter and the width of the LED 127 may be a diameter, diagonal or a transverse width. In the present example the width of the LED 127 is approximately 4.6 mm while the diameter of the light entry surface is approximately 6.6 mm. Thus, the single LES may be located completely within the footprint of the light entry surface such that good optical coupling is provided. The light entry surface 230 may shape the light entering the optic element. The entry surface 230 may be surrounded by an annular guide 232 that guides most of the light emitted from the LED 127 to the filament portion 208. However, because the optic element 200 is made of an optically transmissive material, a portion of the light from the LEDs will enter the optic element 200 and be emitted from the base 206 as side light and/or back light. In some embodiments the optic element 200 arranged as described herein provides 6-10% more downlight than a LED disposed at the end of the enclosure 112. "Downlight" means light directed toward base 102.

Because the lamp of the invention may use LEDs or LED packages that emit different color light it is desirable that the optic element adequately mix the light such that the individual colors of light are not visible to a person either in viewing the lamp directly or as a reflection off of a surface adjacent to the lamp. It is also desirable that the emitted light has an even far field intensity. The inventors of the present application have discovered that refracting the light emitted by the LED 127 using a refracting surface positioned close to the light source, i.e. the LED 127, provides superior color mixing and light distribution. In one embodiment the light entry surface 230 of the optic element 200 is a refracting entry surface. In one embodiment the refracting entry surface comprises refracting surfaces that are configured to refract light with a tangential component, as well as a possible radial component, such that the light is mixed in optic element 200. Refraction of the light where the refracted ray, when viewed perpendicular to the light source (along axis A-A in the figures) has a tangential component and may have a radial component such that the light is refracted at an angle relative to a radial line is referred to herein as "tangential refraction". Tangential refraction is not limited to light refracted only tangentially at a radius emanating from the light source but refers to a refracted light ray that has a tangential component. The refracting surfaces add a tangential vector component to the surface normal of the indicated surfaces thereby adding a tangential component to the light as it passes through the refractive interface as will be described. Tangential refraction causes the light emitted from the LEDs to travel out of the initial vertical plane of travel such that the light is mixed as the light passes through the refracting entry surface 230. Use of the refracting surfaces also provides greater efficiency than using a diffusive surface. For example, if the entry surface 230 is provided with a diffusive or scattering surface a significant portion of the light that impinges the entry surface would be reflected back toward the LED assembly, be absorbed and not be emitted from the lamp. This loss lowers the efficiency of the lamp. Using a refracting entry surface 230 results in less loss because the light is directionally directed and less of the light is directed back toward the LED assembly and is lost.

Figure 27:
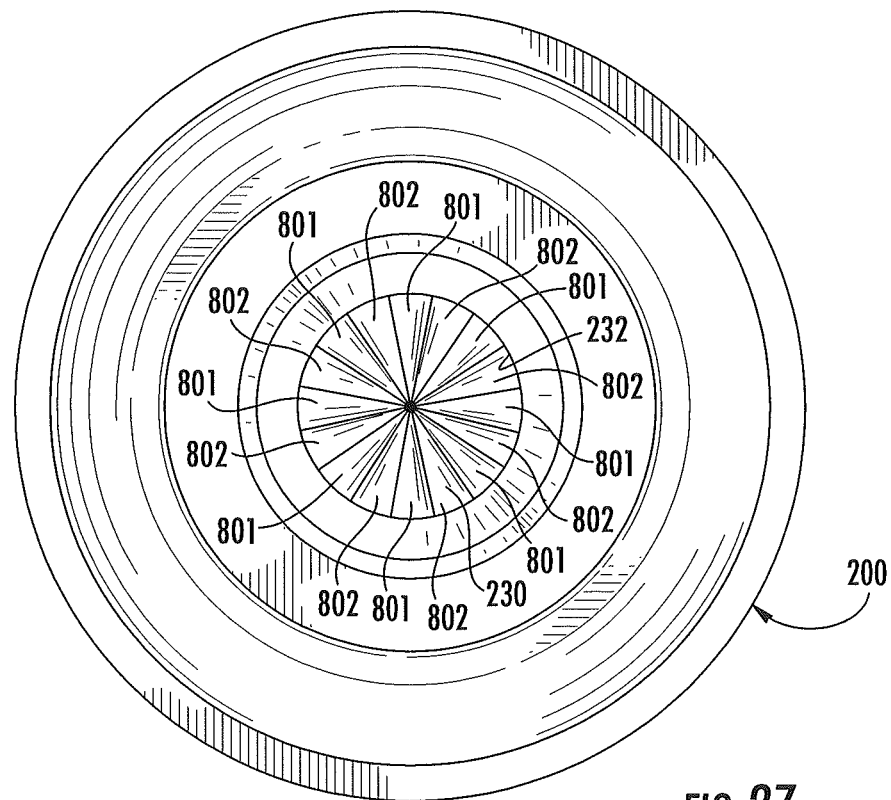
FIG. 27 is a bottom view of the optic element according to embodiments of the present invention.
Figure 28:
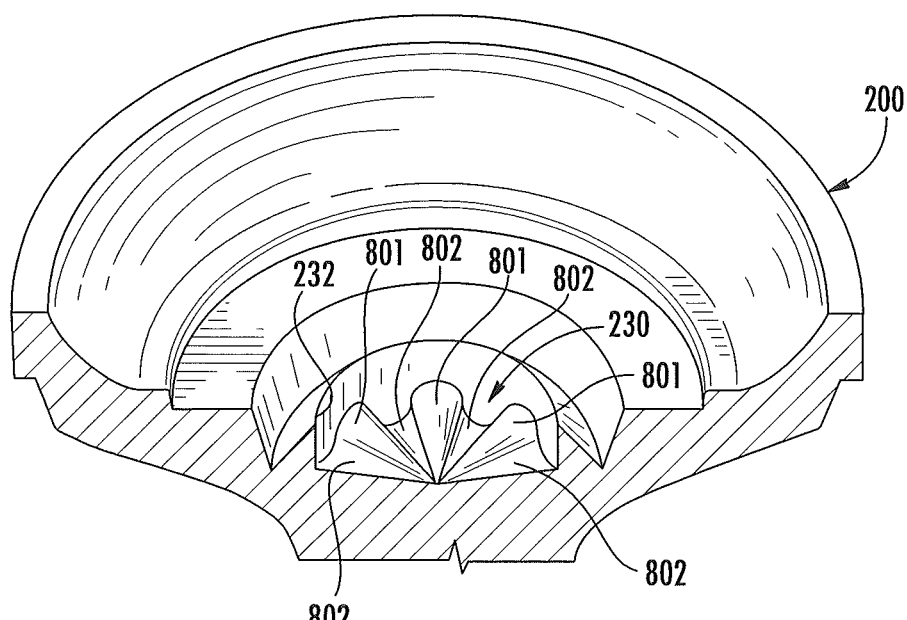
FIG. 28 is a bottom perspective section view of the optic element of FIG. 27.
Figure 39:
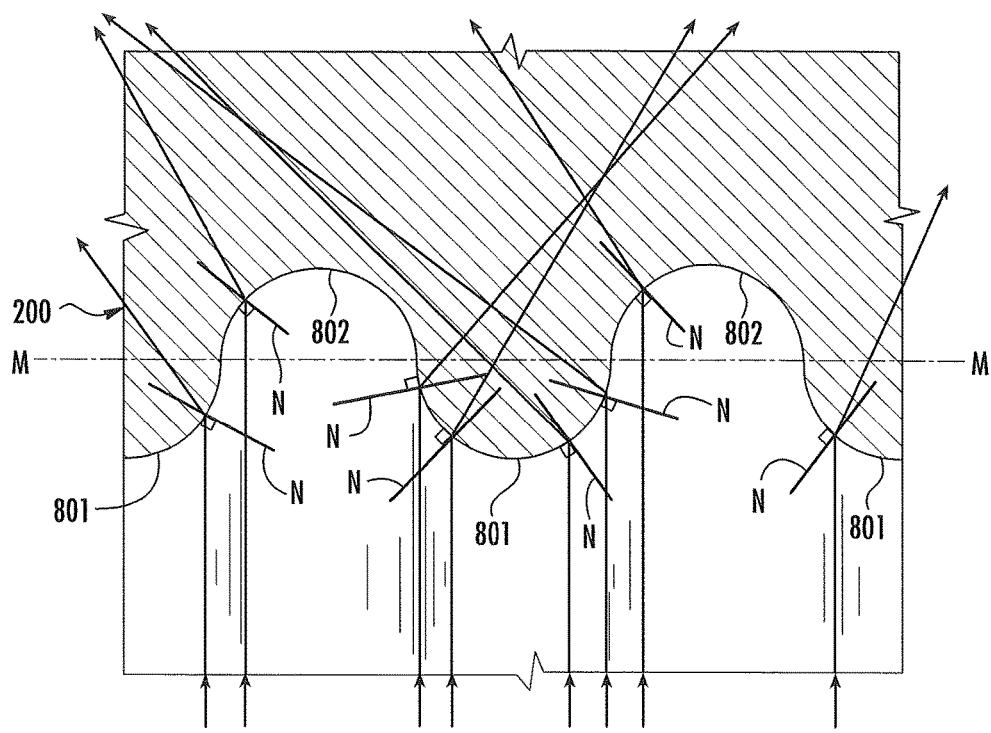
FIG. 39 is a schematic section and FIG. 40 is a schematic plan view useful in explain the operation of the optic element of the invention.

Referring to FIGS. 27 and 28 in one embodiment the refracting entry surface 230 is provided with a plurality of refracting surfaces 801, 802 that are disposed such that light incident on the refracting surfaces is refracted with a tangential component at varying angles such that the light is mixed in the optical element 200. In one embodiment the refracting surfaces 801, 802 extend radially along lines that extend radially from a center of the entry surface 230 to the annular guide surface 232. The refracting surfaces 801, 802 comprise a plurality of semi-conical or pie shaped surfaces that together form the refracting entry surface 230. In one embodiment the refracting surfaces alternate convex refracting surfaces 801 and concave refracting surfaces 802 where alternating ones of the refracting surfaces extend into and out of the plane M-M of the entry surface 230. For example, convex refracting surfaces 801 extend out of the plane and concave refracting surfaces 802 extend into the plane such that the entry surface 230 has a generally sinusoidal shape as the surface is traversed at any given radius as shown in FIG. 39. In one embodiment the surfaces 801, 802 have a circular cross-section in a transverse perpendicular plane, i.e. a plane parallel to the longitudinal axis A-A of the lamp (perpendicular to FIG. 27) and perpendicular to a radial line extending along the refracting surface, such that each surface 801, 802 is generally conical in shape where each surface forms approximately half of a cone. While in some embodiments the surfaces are circular in cross-section in other embodiments the surfaces may be ellipsoidal in cross-section. In other embodiments the surfaces may have irregularly curved surfaces in cross-section. In some embodiments the transitions between adjacent surfaces of the refracting entry surface are fillets or rounds such that sharp transitions between surfaces are avoided. The refracting surfaces 801, 802 may extend substantially along radii of the optic element from the center of the optic element where the center of the entry surface 230 is centered over the LED 127. While the lamp and optic element in the drawings are circular in form, the lamp and optic element may have other shapes where the refracting surfaces extend in a substantially radial direction from a point centered over the LED 127. Typically, the entry surface is centered over the LEDs and the LEDs are arranged symmetrically relative to the entry surface; however, in some embodiments the LED 127 and refracting surfaces may be offset from the axis of the optic element 200. Moreover, the entry surface 230 and the LED 127 may be centered relative to the longitudinal axis A-A of the lamp or offset from the longitudinal axis A-A.

It will be appreciated that in some embodiments sharp transitions such as internal or external corners may create visible lines or spots of color or intensity in the emitted light pattern. Thus, while it is possible to make the refracting surfaces with non-curved surfaces such as triangular or rectangular transverse cross-sections, the use of curved surfaces provides better light mixing. Using a continuously curved refracting surface, the normal direction to the surface N changes continuously (see FIG. 39) such that the light impinging the refracting surface is refracted at a continuously variable angle. As a result, the refracted light from each of the continuously curved surfaces is thoroughly mixed to eliminate visible areas of color or intensity variations. If the refracting surfaces were provided with straight surfaces, e.g. a prismatic surface, the light incident on the surface interface would be refracted at the same angle over the entire refracting surface. While some mixing of the light will occur the light may be emitted as visible lines of color and/or intensity. However, a surface made of a plurality of flat surfaces will, if the number of flat surfaces is great enough, for practical purposes operate in the same manner as a continuously curved surface to mix the light and eliminate visible areas of color and/or intensity variations. Thus the terms "continuously curved" and "continuous curve" are used herein to designate a curved surface as well as a surface made of a large number of planar surfaces that performs like a continuously curved surface in the mixing of visible light. To distinguish the two continuously curved surfaces herein, the term "faceted curved surface" is used herein to refer to a continuously curved surface that comprises a large number of flat facets to define the curve and the term "geometrically curved surface" is used herein to refer to a continuously curved surface that comprises a curved surface without flat surfaces. It will be appreciated that while the entry surface 230 illustrated in FIGS. 27 and 28 includes alternating concave and convex surfaces 801, 802 having a semi-conical shape the entry surface may be provided with refracting surfaces of other more complicated shapes provided the surfaces refract the light with a tangential component and provide sufficient light mixing.

Figure 40:
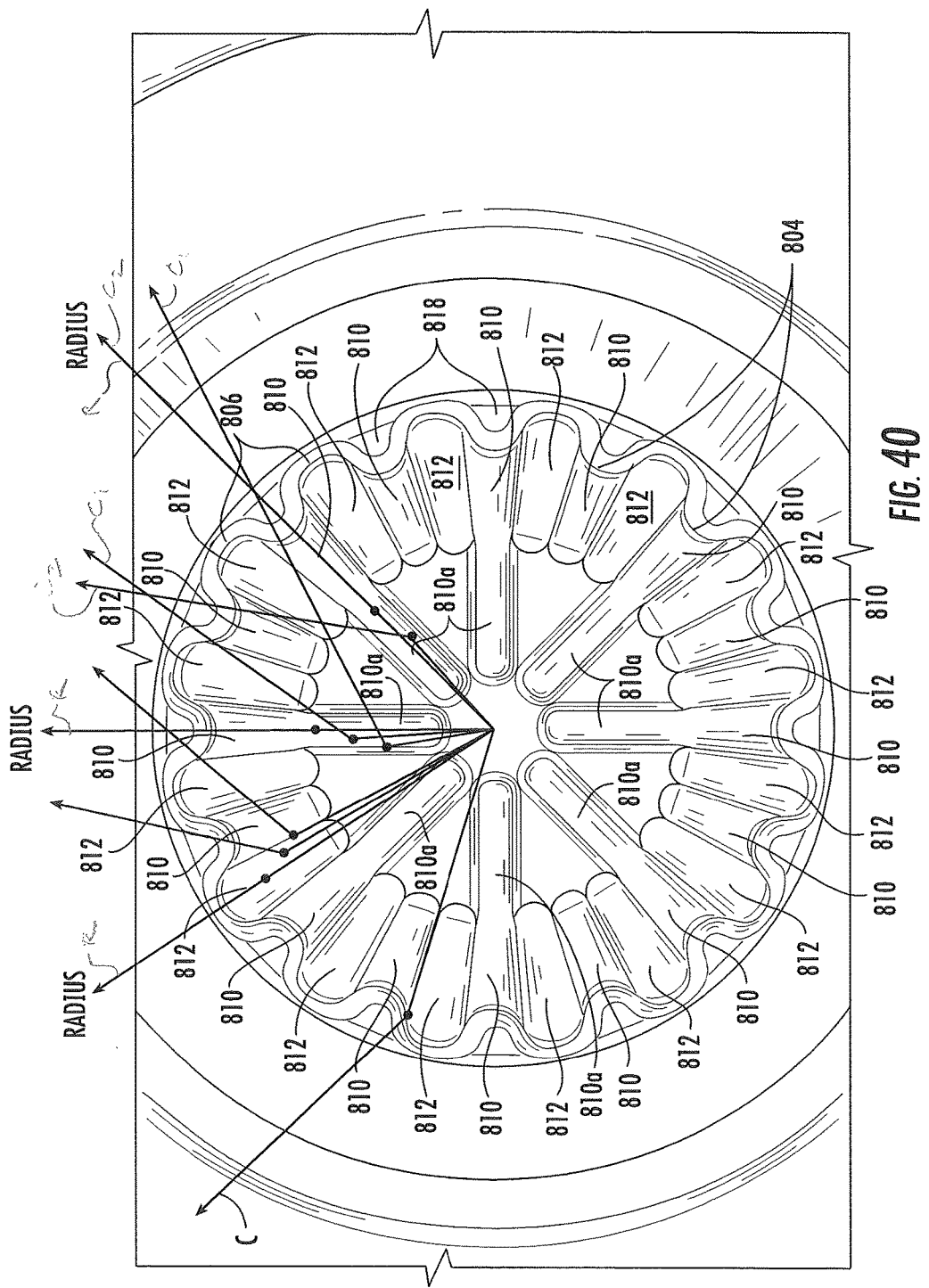

Tangential refraction is illustrated schematically in FIGS. 39 and 40. Tangential refracting or tangential refraction as used herein means that substantially all of the light hitting a refracting surface is refracted at an angle relative to a radius of the refracting entry surface 230 such that the light from the plurality of refracting surfaces is mixed to provide a more uniform color and intensity distribution emitted from the lamp. As shown in FIG. 40, the light rays emitted from the LED 127 are shown as arrows. The light rays are shown as emanating from a point that is centrally located relative to the entry surface 230 for explanatory purposes. In an actual device a plurality of LED devices or packages are disposed about this point and emit light in at least two colors. The light is incident on the refracting surfaces 810, 812, 810a (as represented by dots in FIG. 40) for example and is refracted at varying angles relative to a radial line extending from the light source such that the light is mixed. Where different light emitting devices or packages are used that emit light of having different spectral outputs and in particular different visible colors, the mixing provides a more uniform color in the emitted light. Where the refracting surfaces are disposed on radii from the center of the LED, a radial line from the light source will extend along the center of the refracting surfaces. Light that impacts the refracting surfaces on the radial line will not be tangentially refracted because the normal to the refracting surface along the radial line is perpendicular to the plane of the entry surface. Thus the light rays R that are incident on the semi-circular refracting surfaces on the radial line are not refracted tangentially and travel in the same vertical plane (perpendicular to the entry surface 230) after entering the optic element (these rays are refracted vertically). Light impacting the refracting surfaces at any point other than along the radial line will be tangentially refracted because the normal to the refracting surface at any other point is at an angle as shown in FIG. 39. Thus, most of the light incident on the refracting surfaces is tangentially refracted. Moreover any light that impacts the annular guide surface 232 will also be refracted as shown by arrow C. Light is incident to the refracting entry surface 230 over substantially the entire area of the refracting entry surface 230 and not just at independent points as shown in FIG. 40 such that the light will be refracted over continuously varying angles. Light may be considered to be tangentially refracted where the light is refracted out of the original plane of travel transverse to the entry surface. As illustrated in FIGS. 39 and 40 the light is mixed across the optic element 200 such that light of different spectral outputs such as different visible colors C1 and C2 are mixed.

Figure 30:
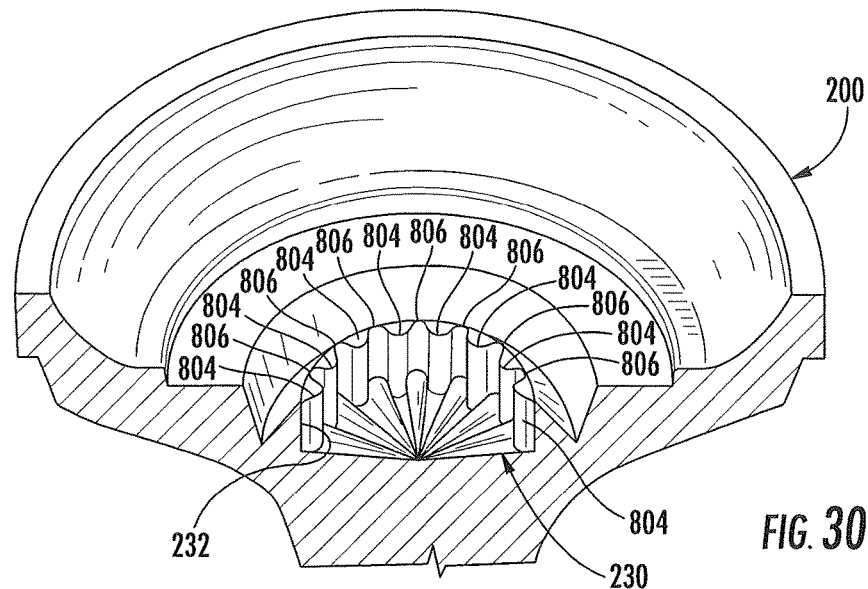
FIG. 30 is a bottom perspective section view of the optic element of FIG. 29.
Figure 29:
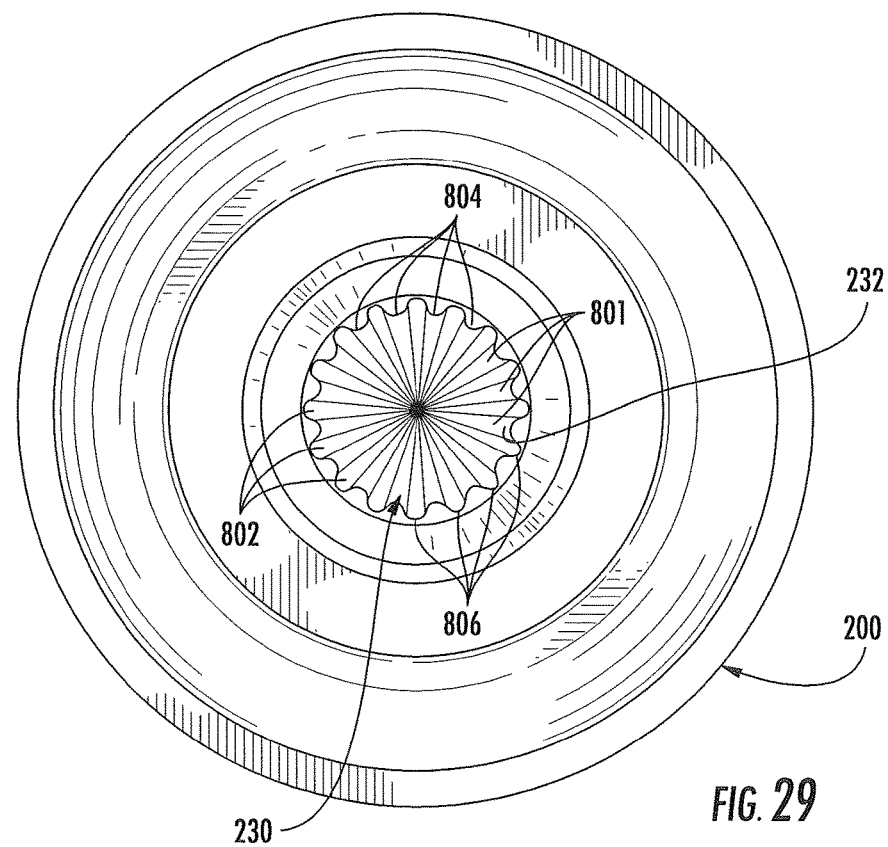
FIG. 29 is a bottom view of the optic element according to other embodiments of the present invention.
Figure 31:
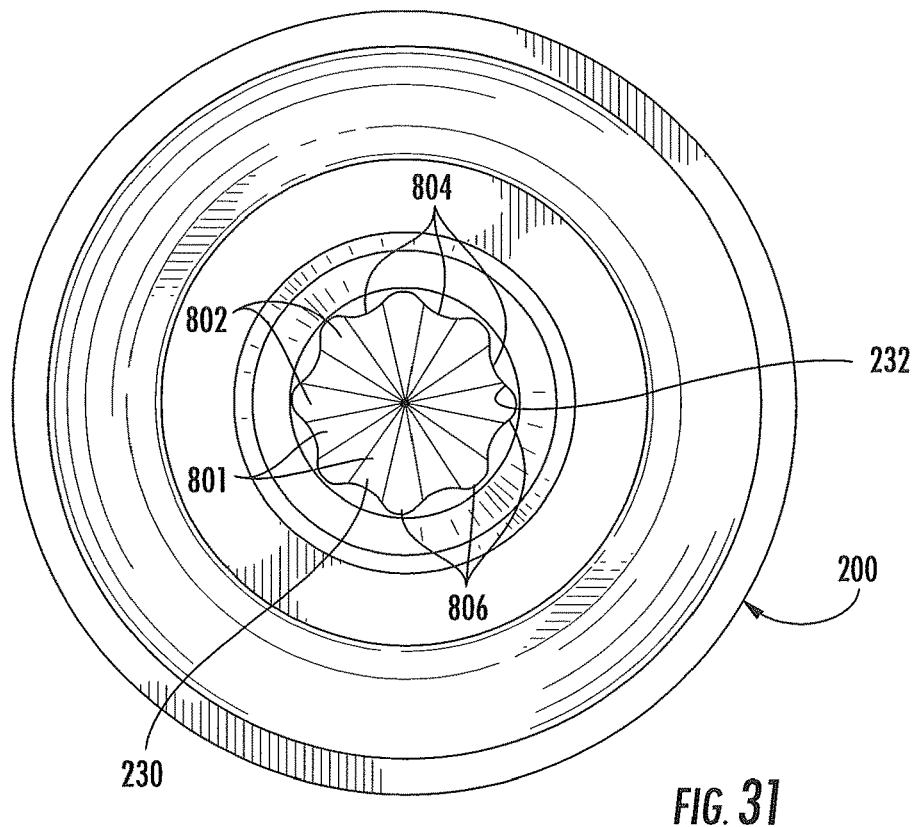
FIG. 31 is a bottom view of an optic element according to other embodiments of the present invention.
Figure 32:
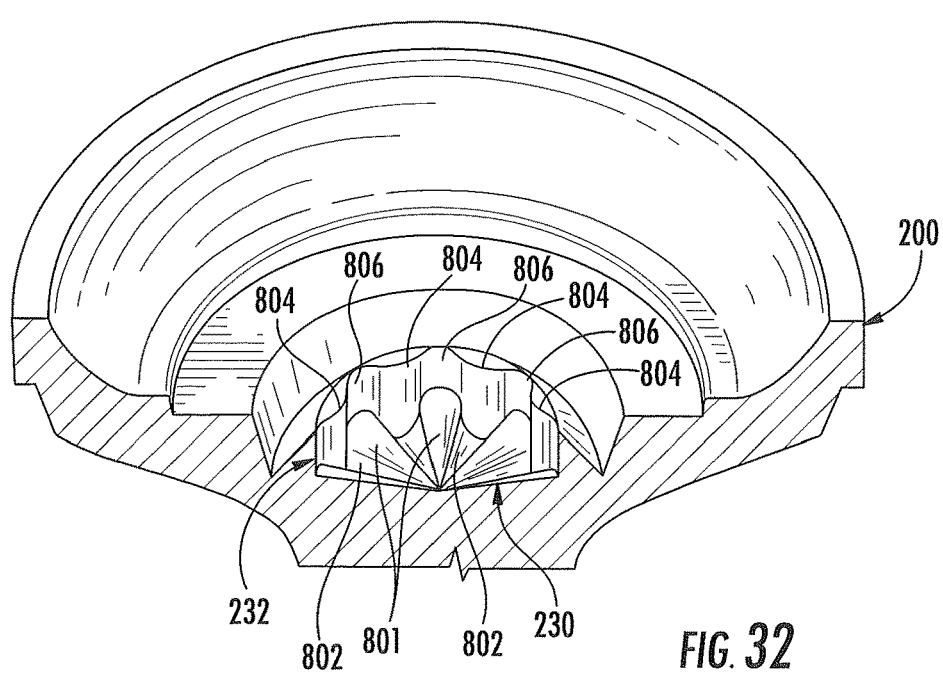
FIG. 32 is a bottom perspective section view of the optic element of FIG. 31.
Figure 33:
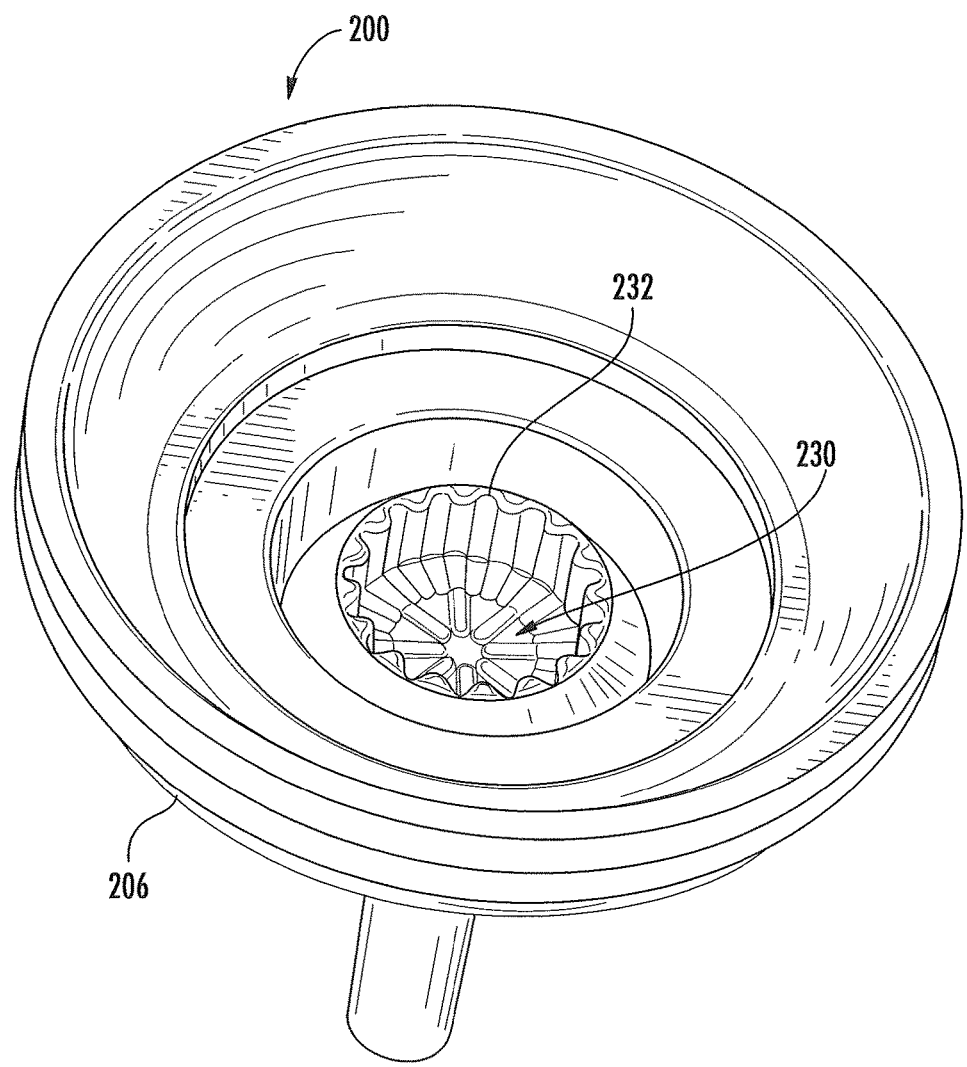
FIG. 33 is a bottom perspective view of an optic element according to yet other embodiments of the present invention.
Figure 34:
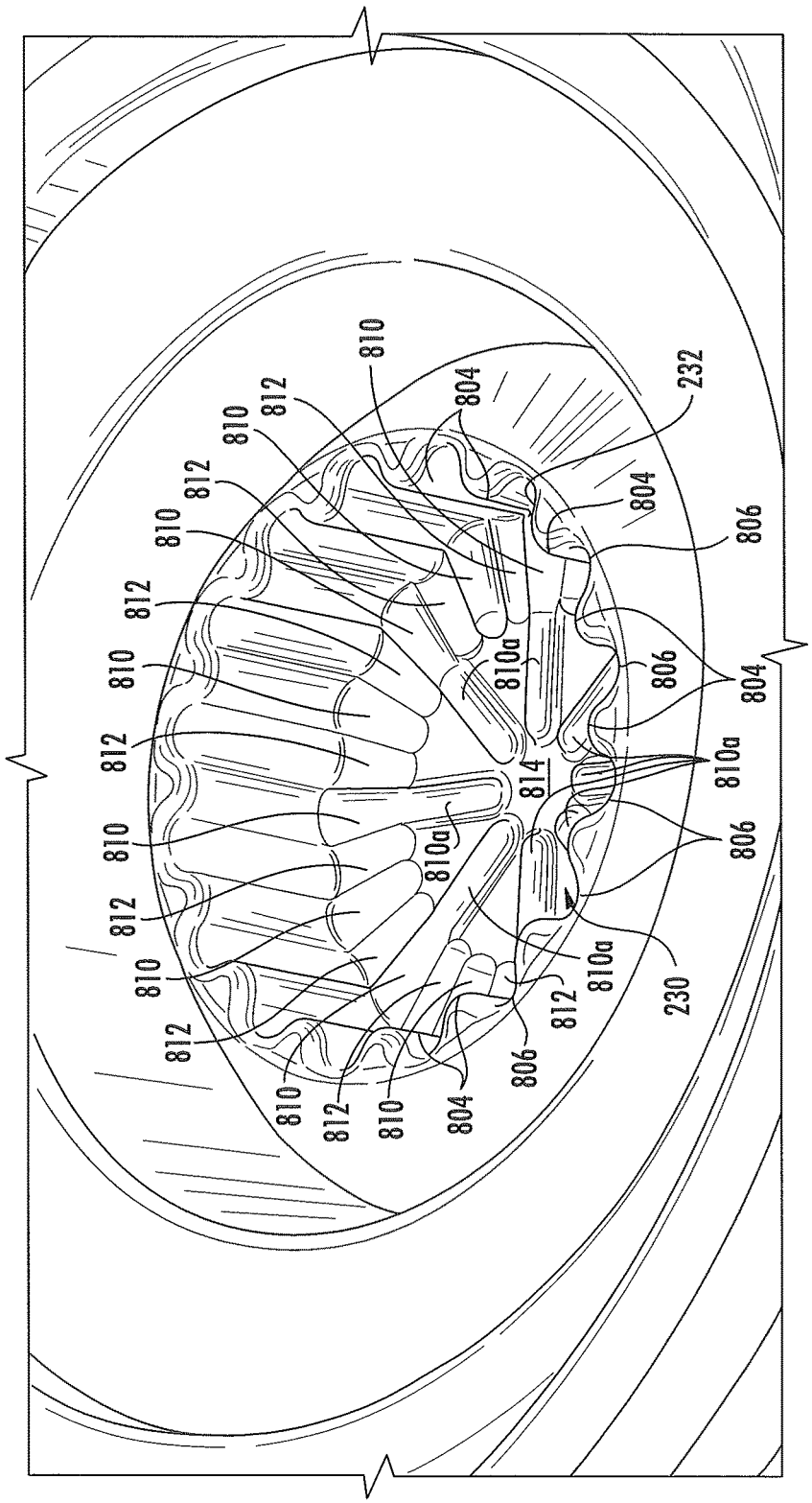
FIG. 34 is a detailed bottom perspective view of the optic element of FIG. 33.
Figure 35:
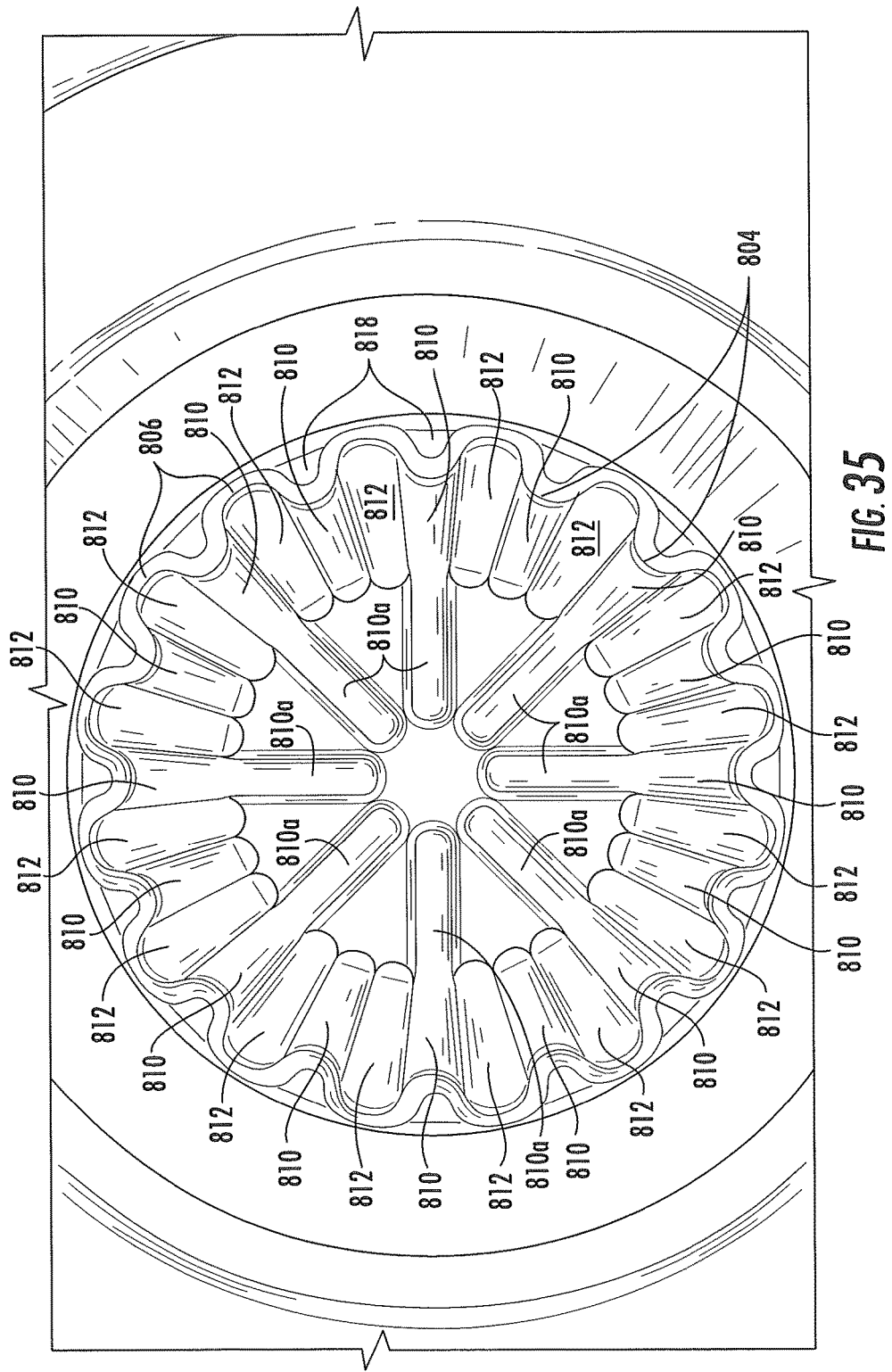
FIG. 35 is a detailed bottom view of the optic element of FIG. 33.
Figure 36:
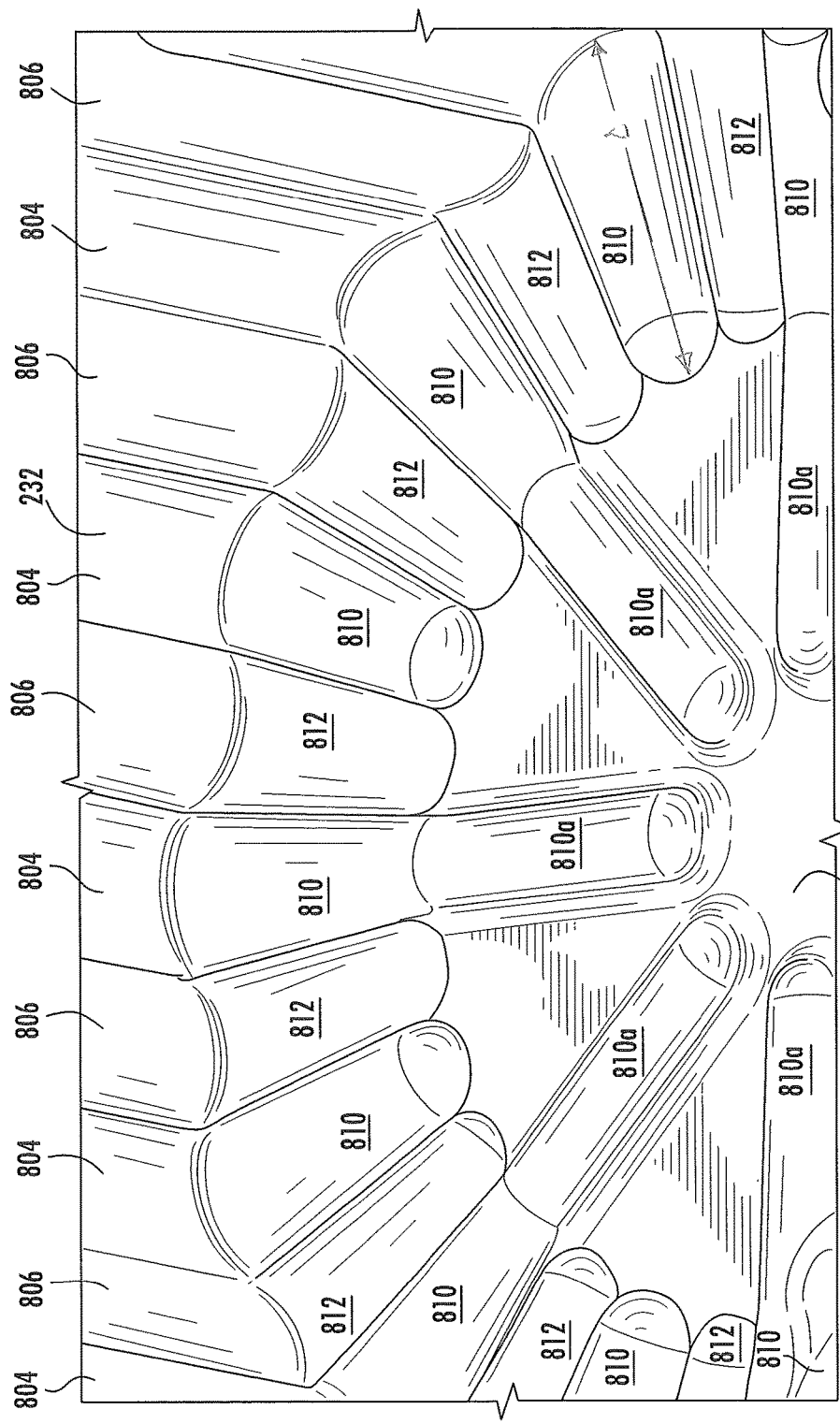
FIG. 36 is a detailed bottom perspective view of the optic element of FIG. 33.

While an entry surface having sixteen refracting surfaces 801, 802 is shown in FIGS. 27 and 28 a greater or fewer number of refracting surfaces may be provided depending on the size, spacing, number and colors of the light source and the size of the optic element. In some embodiments the larger the number of refracting surfaces for a given light source the better the light mixing. FIGS. 29 and 30 show an embodiment of the refracting entry surface having 32 refracting surfaces 801, 802.

The number, size and shape of the refracting surfaces may be limited by manufacturing tolerances in any given application. For example, if the optic element 200 is molded, the number of refracting surfaces may be limited by the mold design. To the extent more exacting manufacturing processes are used or developed, the number of refracting surfaces may be increased. Moreover, while the refracting surfaces are shown extending radially from the center of the entry surface 230 and a point centered over the LED 127, the refracting surfaces may be offset somewhat from the exact radius provided sufficient tangential light refraction occurs to adequately mix the light. Moreover, each of the refracting surfaces 801, 802 does not have to be identical such that the different ones of the refracting surfaces may be wider, narrower, longer or shorter than other ones of the refracting surfaces.

In some embodiments, the annular guide surface 232 may also be formed with longitudinal refracting surfaces 804, 806 to further mix the light as shown in FIGS. 29-37. The longitudinal refracting surfaces may comprise alternating convex surfaces 804 and concave surfaces 806 that extend along the longitudinal axis of the lamp generally perpendicular to the entry surface 230 such that the annular guide surface 232 has a generally sinusoidal shape as the annular guide surface is traversed. In one embodiment the refracting surfaces 804, 806 have a circular cross-section. Because the refracting surfaces on the annular guide surface extend generally parallel to the longitudinal axis these surfaces may have a generally cylindrical shape where each surface is approximately one half of a cylinder. While in some embodiments the surfaces are semi-circular in cross-section in other embodiments the surfaces may be ellipsoidal in cross-section. In other embodiments the surfaces may have irregularly curved surfaces in cross-section. In some embodiments the transitions between adjacent surfaces may be fillets or rounds such that sharp transitions between surfaces are avoided. Other arrangements may also be provided where for example each surface 804, 806 is conical in shape where the alternating surfaces are inverted relative to one another. In the illustrated embodiment the convex refracting surfaces 804 on the annular guide surface 232 meet convex refracting surfaces 801 on the entry surface 230 to simplify manufacture of the optic; however, in some embodiments the convex refracting surfaces on the annular guide surface may meet concave refracting surfaces on the entry surface. Other patterns may also be used where convex refracting surfaces on the annular guide surface may meet both concave and convex refracting surfaces on the entry surface and concave refracting surfaces on the annular guide surface may meet both concave and convex refracting surfaces on the entry surface. Moreover, the cross-sectional curves of the refracting surfaces do not all have to be identical. For example, some of the curves may be circular, some may be ellipsoidal and some may have other irregular continuously curved shapes or other combinations. The refracting surfaces may also be of different radii on the same refracting entry surface.

In one preferred embodiment the entire surface of the entry surface 230 has refracting surfaces formed therein such that virtually all light impacting the entry surface will be tangentially refracted as shown in FIGS. 27-32. It will be appreciated that even where the entire entry surface is covered with refracting surfaces some portion of the light will not be tangentially refracted because a small portion of the light hits an area of the surface where the normal to the surface is not angled as previously described. While it may in some embodiments be desirable to make the entire surface of the entry surface 230 and the annular guide surface 232 with refracting surfaces, manufacturing tolerances and limitations may make it impossible or commercially impractical to provide continuous curved tangential refracting surfaces over the entire entry surface 230 and/or annular guide surface 232. For example, in order for the refracting surfaces of FIGS. 27-32 to extend completely to the center of the entry surface 230 the radius of curvature of the refracting surfaces must gradually decrease to near zero at the center of the entry surface. Manufacturing limitations such as machine tolerances may make such a construction impractical or impossible. In order to provide the necessary light mixing in a commercially practical design, other surface designs in addition to that of FIGS. 27-32 have been developed.

Referring to FIGS. 33-37, in some embodiments not all of the refracting surfaces extend to the center of the entry surface. In one embodiment the refracting surfaces extend radially from the annular guide surface 232. The refracting surfaces comprise a plurality of semi-conical or pie shaped surfaces. In one embodiment the refracting surfaces alternate convex refracting surfaces 810 and concave refracting surfaces 812 where alternating ones of the refracting surfaces extend into and out of the plane of the entry surface 230. For example, convex refracting surfaces 810 extend out of the plane and concave refracting surfaces 812 extend into the plane such that the entry surface 230 has a generally sinusoidal shape as the surface is traversed at any given radius. In one embodiment the surfaces have a circular cross-section in a perpendicular plane such that each surface is generally semi-conical in shape where each surface forms approximately half of a cone. While in some embodiments the surfaces are circular in cross-section in other embodiments the surfaces may be ellipsoidal in cross-section. In other embodiments the surfaces may have irregularly curved surfaces in cross-section. In some embodiments the transitions between adjacent surfaces are fillets or rounds such that sharp transitions between surfaces are avoided. The refracting surfaces extend substantially along radii of the optic element from the center of the optic element such that the center of the entry surface 230 is centered over the LED.

The conical refracting surfaces 810, 812 extend from the annular guide surface 232 a distance D (FIG. 36) where decreasing the radius of curvature of the surfaces 810, 812 is no longer practical to manufacture. At this point some of the conical refracting surfaces end while other ones of the refracting surfaces include portions 810a that extend to near the center of the entry surface 230 at a constant minimum radius of curvature. While convex refracting surfaces 810 extend into convex surfaces 810a, the concave surfaces 812, rather than the convex surfaces, may be provided with the extending portions. In other embodiments, cylindrical, rather than conical, refracting surfaces may be used where some or all of the refracting surfaces extend from the annular guide surface 232 toward the center of the entry surface 230 at a constant radius of curvature over their entire length. It will be appreciated that the term radius of curvature as used herein refers to the height or depth of the surfaces relative to a plane M-M such as surface 814. Where the refracting surfaces are semicircular in cross-section the radius of curvature is a true radius of curvature. Where the refracting surfaces are semi-ellipsoidal the radius of curvature may be considered to be the height of the ellipse from the plane defining the two focal points. For other curves the radius of curvature may be defined as the maximum height of the surface from a theoretical plane.

In the embodiment of FIG. 33-36 the surface 814 between the reflecting surfaces 810, 810a, 812 is flat. It has been determined that in some embodiments sufficient radial refraction occurs to mix the light to provide a suitable color and intensity mix when the refracting surfaces cover at least 50% of the entry surface 230. While in the embodiment of FIGS. 33-36 the surface 814 is flat, this area may be provided with refracting surfaces even if the refracting surfaces in these areas do not follow the pattern of the main refracting surfaces. This is also true for the areas 818 (see FIG. 35) between the refracting surfaces 804, 806 on the annular guide surface 232 which may be flat of may be provided with a curved surface to provide some tangential refraction.

In yet another embodiment the entry surface may comprise a plurality of either convex or concave refracting surfaces having for example the conical shape of FIG. 26 where the refracting surfaces are separated by relatively small fillets or rounds rather than by full size refracting surfaces. In such an embodiment, the fillets or rounds that connect the refracting surfaces may be made with a large enough radius of curvature that the fillets/rounds do not act as sharp corners and create visible dark areas in the emitted light.

Figure 37:
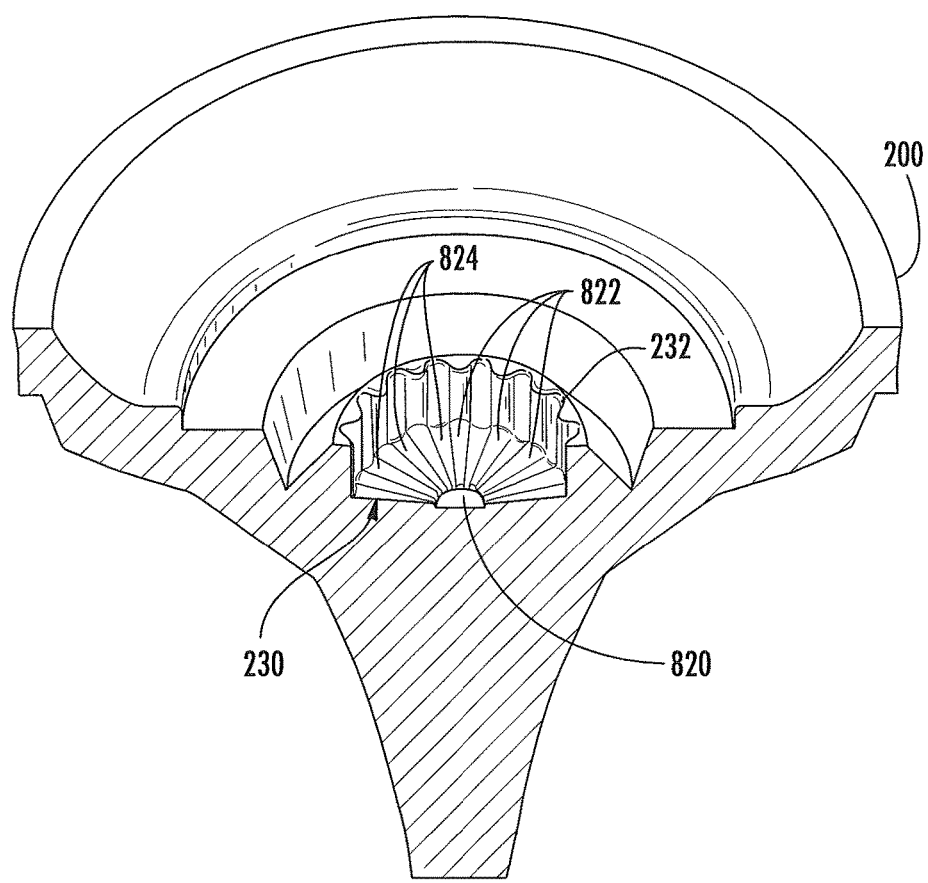
FIG. 37 is a bottom perspective section view of an optic element according to still other embodiments of the present invention.

Referring to FIG. 37 in another embodiment, the refracting surfaces comprise a plurality of semi-conical shaped surfaces such as previously described. The surfaces extend from the annular guide surface 232 toward the center of the entry surface 230. Unlike the embodiment of FIG. 27 the refracting surfaces terminate short of the center of the entry surface 230. As a result, in the embodiment of FIG. 27 the center area 820 of the entry surface 230 is formed without refracting surfaces and may be flat. As previously explained it has been determined that sufficient tangential refraction occurs to mix the light to provide a suitable color mix when the refracting surfaces cover at least 50% of the entry surface. While in the embodiment of FIG. 37 the center area 820 is flat, a curved surface may be provided in this areas to provide some tangential refraction even if the curve surface in this area does not follow the pattern of the main refracting surfaces. As previously described, the refracting surfaces may alternate convex surfaces 822 and concave surfaces 824 where alternating ones of the surfaces extend into and out of the plane of the entry surface. For example, convex refracting surfaces 822 extend out of the plane and concave refracting surfaces 824 extend into the plane such that the entry surface has a generally sinusoidal shape as the surface is traversed at any given radius. In one embodiment the surfaces have a circular cross-section such that each surface is generally conical in shape where each surface forms half of a cone. While in some embodiments the surfaces are circular in cross-section in other embodiments the surfaces may be ellipsoidal in cross-section. In other embodiments the surfaces may have irregularly curved surfaces in cross-section. In some embodiments the transitions between adjacent surfaces are fillets or rounds such that sharp transitions between surfaces are avoided. It will be appreciated that while the entry surface illustrated in FIG. 37 includes alternating concave and convex surfaces having a conical shape the entry surface may be provided with refracting surfaces of other more complicated shapes provided the surfaces tangentially refract the light and provide sufficient light mixing.

In some embodiments the larger the number of refracting surfaces for a given light source the better the light mixing. The number, size and shape of the refracting surfaces may be limited by manufacturing tolerances in any given application. Moreover, while the refracting surfaces are shown extending radially from the center of the entry surface, the refracting surfaces may be offset somewhat from the radius provided sufficient tangential light refraction occurs to adequately mix the light. Moreover, each of the refracting surfaces does not have to be identical such that the different ones of the refracting surfaces may be wider, narrower, longer or shorter than other ones of the refracting surfaces.

While the number of refracting surfaces may vary as previously described, generally the greater the number of refracting surfaces the better the light mixing. It has been found that for a light source having four substantially equally spaced LED devices as shown herein sixteen refracting surfaces adequately mixes the light to eliminate visible color and intensity variations. However, lamps with four and eight refracting surfaces show improved light mixing as compared to a lamp with no near field refracting surfaces. It has further been found that a symmetric arrangement of the refracting surfaces relative to the LED packages/chips provides a better mixing of the visible emitted light. It has further been found that the radial variations in surface normal close to the light source provides better light mixing as compared to refracting surfaces provided remote from the light source. Thus, for example providing the refracting surfaces on the entry surface 230 of the optic element 200 provides better light mixing than providing similar refracting surfaces on the outside surface of the optical element. Thus, while the outside surface of the optical element may be provided with refracting surfaces to further mix the light, suitable light mixing is achieved by providing the refracting surfaces only on the entry surface of the optical element. Moreover, providing the refracting surfaces only on the outside surface of the optical element does not provide suitable light mixing.

Figure 38:
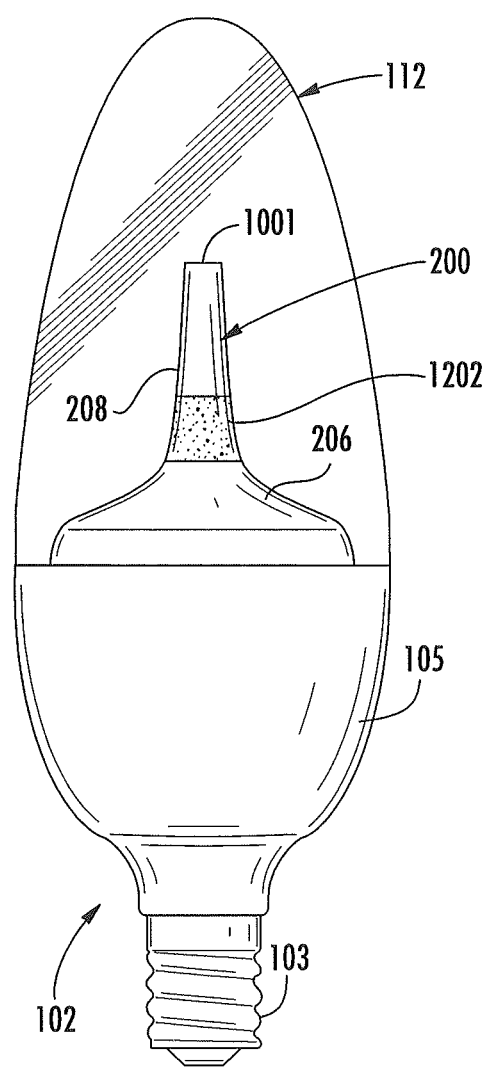
FIG. 38 is an external side view of a solid-state, LED lamp having a form factor of a candelabra bulb according to other embodiments of the present invention.

In order to provide sufficient back light, for example, to meet Energy Star requirements for lamps, the stem may be provided with a diffusive surface to create scattering of the light. In one embodiment the diffusive surface 1207 may be provided on the stem 208 from a point adjacent the base 206 of the optic element 200 to a point spaced from the distal end of the stem as shown in FIG. 38. In one embodiment, the diffusive surface covers approximately 50% of the height of the stem. In other embodiments, the diffusive surface covers approximately 40-60% of the height of the stem. The distal end 1001 of the stem may also be made with a diffusive surface to increase light emitted as back light. With the refracting surfaces as described herein and the diffusive layers arranged as shown in FIG. 38, the optic element 200 emits approximately between 7.5% and 9.5%, and in some embodiments emits approximately between 7.93-9.20%, back light. Where backlight is defined as light emitted over 110 degrees per Energy Star requirements. In the examples provided above the scattering layer was provided by 20 µm thick surface acrylic film containing isotropic scattering particles with a 20 µm mean free path. The diffusive surface may be provided in any suitable manner such as roughening the outer surface, manufacturing a roughened surface during manufacture of the optic element. e.g. in the molding process, by applying a diffusive film, coating paint or this like or in any suitable manner.

Figure 41:
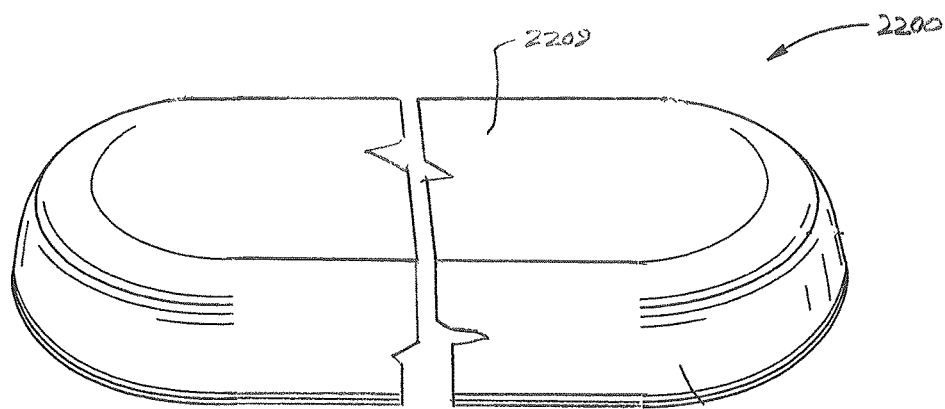
FIG. 41 is perspective view of an optic element according to other embodiments of the present invention.
Figure 42:
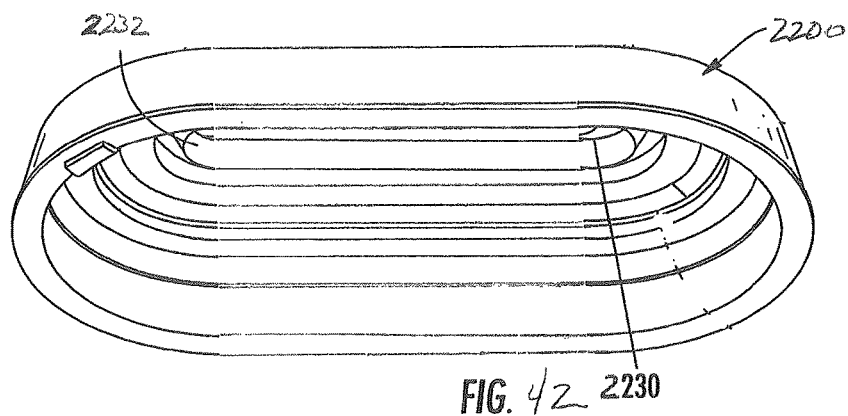
FIG. 42 is another perspective view of the optic element of FIG. 41.
Figure 43:
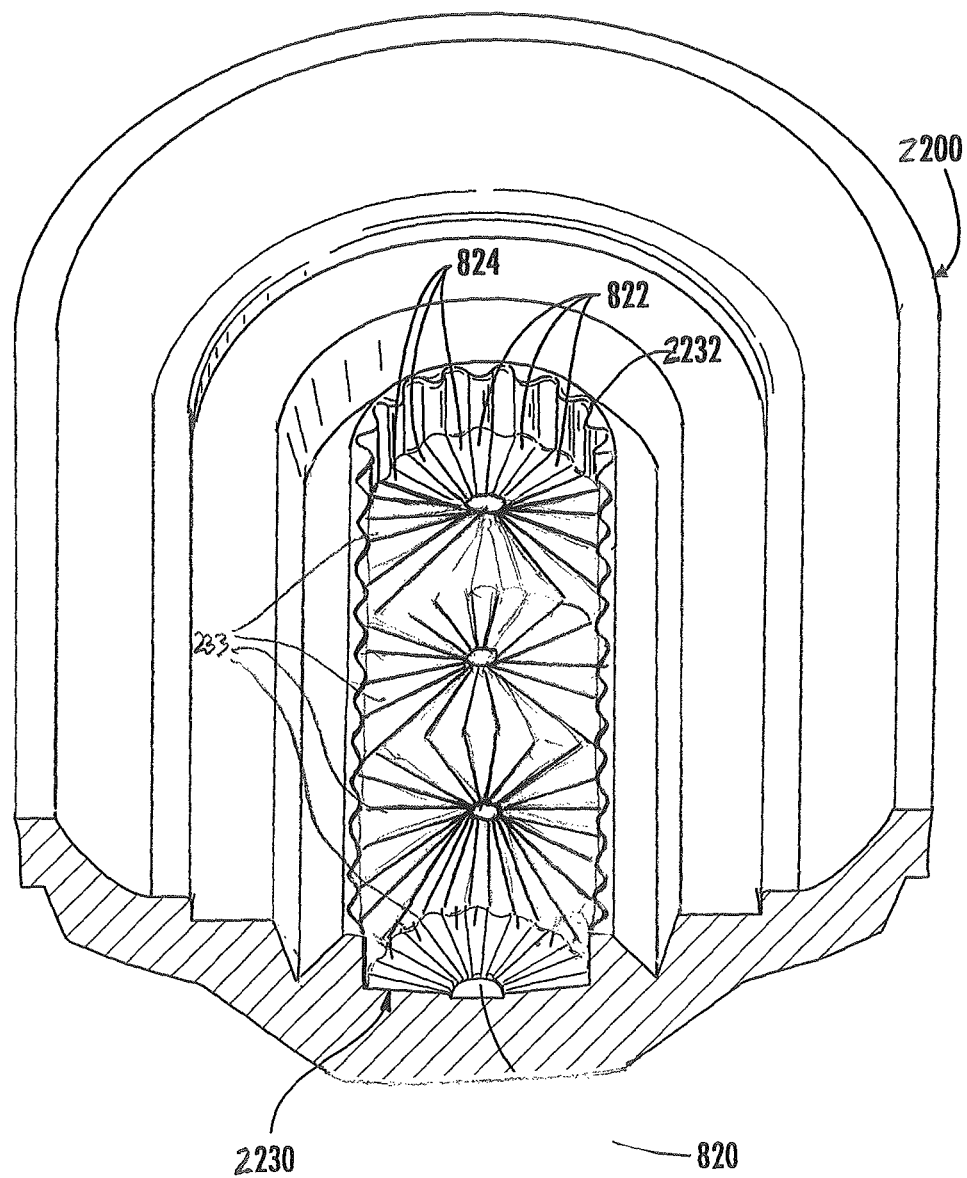
FIG. 43 is a bottom perspective section view of the optic element of FIG. 41.
Figure 44:
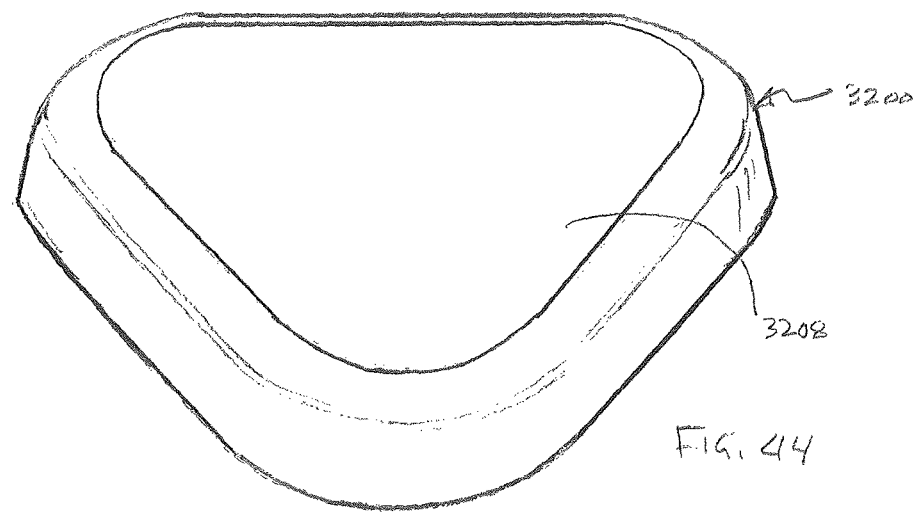
FIG. 44 is perspective view of an optic element according to still other embodiments of the present invention.
Figure 45:
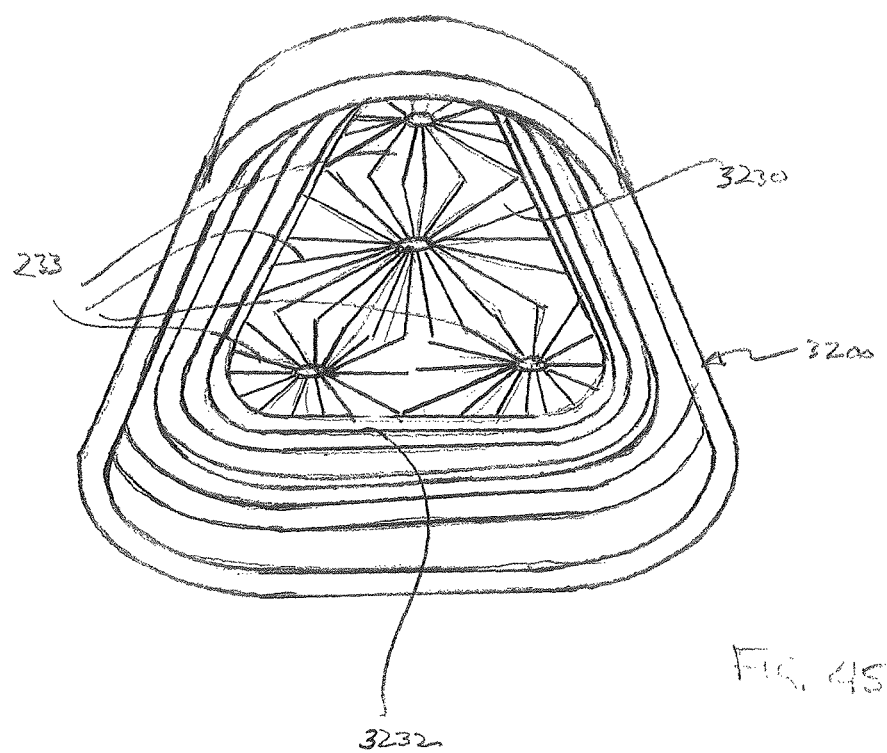
FIG. 45 is another perspective view of the optic element of FIG. 44.

In other embodiments the optic element may have other shapes. For example the optic element may be formed as a globe or cylindrical shape as shown in FIG. 23 suitable for use in an omnidirectional lamp. In other embodiments the optic element 2200 may have an elongated shape where a width of the first refracting entry surface is smaller than a length of the first refracting entry surface as shown in FIGS. 41-43. Such an embodiment is suitable for use in an elongated LED lamp such as a troffer style lamp. Optic element 2200 has a refractive entry surface 2230 and an annular guide surface 2232. Both the refractive entry surface 2230 and the annular guide surface 2232 may be provided with refracting surfaces as previously described. In some embodiments the patterns of the refracting surfaces on the refractive entry surface 2230 and the annular guide surface 2232 may be the same or similar and in other embodiments the patterns of the refracting surfaces on the refractive entry surface 2230 and the annular guide surface 2232 may be different. In other embodiments the optic element 3200 may have a triangular shape as shown in FIGS. 44-45. Optic element 3200 has a refractive entry surface 3230 and an annular guide surface 3232. Both the refractive entry surface 3230 and the annular guide surface 3232 may be provided with refracting surfaces as previously described. In some embodiments the patterns of the refracting surfaces on the refractive entry surface 3230 and the annular guide surface 3232 may be the same or similar and in other embodiments the patterns of the refracting surfaces on the refractive entry surface 3230 and the annular guide surface 3232 may be different. The optic element may have other shapes than those specifically shown and described based on the style of lamp and the desired light emission pattern. In the embodiments shown in FIGS. 23 and 41-45 the optic element is formed without the extending stem used in the candelabra lamp such that the optic element may have a relatively smooth uninterrupted top surface 725, 2208, 3208 that may be relatively flat. Depending on the size and shape of the refractive entry surface 230, 2230, 3230 and the annular guide surface 232, 2232, 3232 the refracting surfaces may be provided as multiple patterns 233 on the same surface as shown in FIGS. 43 and 45 where one of the multiple patterns may be centered over or otherwise aligned with one of multiple LEDs. The multiple patterns 233 do not have to be identical such that different ones of the LEDs may be primarily incident on a different pattern of refracting surfaces. In other embodiments the substantially identical multiple patterns 233 may be used such that different ones of the LEDs are incident on the same pattern of refracting surfaces.

As described herein the refractive entry surface 230, 2230, 3230 and the annular guide surface 232, 2232, 3232 create an entry cavity for receiving light emitted by the LEDs 127 where the refractive entry surface and the annular guide surface both function as entry surfaces to the optic element. The refractive entry surface and the annular guide surface are positioned in different planes relative to the LEDs such that the first entry surface, e.g. refractive entry surface 230, 2230, 3230, is disposed to receive the light from the LEDs at a first angle and the second refracting entry surface, e.g. the annular guide surface 232, 2232, 3232, is disposed to receive the light from the at least two LEDs at a second angle. The first entry surface and the second entry surface being in two different planes means that the two surfaces meet at an angle other than 180 degrees. While the two refracting surfaces may be at a 90 degree angle relative to one another to define the entry cavity, the two refracting surfaces may be at other than 90 degrees with respect to one another.

In one embodiment, the light may be emitted with a periodic or aperiodic oscillation of intensity to mimic the flicker of a gas and/or candle flame. The light may be provided with a frequency of amplitude change in the range of approximately 5 and 60 Hz. The pseudo-random or periodic modulation of the light amplitude may be provided using a linear-feedback shift register or a microcontroller to generate a modulation signal.

In one embodiment, the LED 127 may be controlled to control the color of the light emitted from the optic element 200. In one embodiment, the light is controlled such the light emitted from the optic element 200 may be, under certain operating conditions, red/orange/red-orange in color. Software may be used to shunt current to and from selected LED 127 to control the color of the light emitted by the LED assembly 120. In one embodiment, the color of the light may be changed from essentially white light to red/orange/red-orange light when a user lowers the current delivered to the LED power supply 110. In one embodiment a dimmer switch may be provided to control the current delivered to the LED power supply. The dimmer switch may be provided in the electrical path and may be part of the fixture with which the lamp 100 is used or it may be located remotely from the fixture such as on a wall as is typical of a standard light switch. When the current delivered to the LED power supply 110 falls below a predetermined value, the power supply software shunts the current to desired LED 127 to change the color of the light emitted from the LED assembly 120. By making the color change to red/orange/red-orange when the current is lowered (such as in response to a user controlled dimmer switch) the optic element 200 can be made to glow red-orange in the area of the light emitting area 202, 1202 to simulate the look of a dimmed incandescent bulb. In some embodiments, the color may change as the current passes predetermined levels. For example, at a first current level the color may change to red-orange and at a second current level the color may change to orange and at a third current level the color may change to white. As the current level rises the lumens output by the LED 127 may also increase such that the brightness of the lamp increases as the color changes.

In some embodiments a wireless module 600 may be provided in the lamp (FIG. 5) for receiving, and/or transmitting, a radio signal or other wireless signal between the lamp and a control system and/or between lamps. The wireless module 600 and related smart technologies may be used in any embodiment of the lamp as described herein. The wireless module 600 may convert the radio wave to an electronic signal that may be delivered to the lamp electronics 110 for controlling operation of the lamp. The wireless module may also be used to transmit a signal from the lamp. The wireless module 600 may be positioned inside of the enclosure 112 such that the base 102 including Edison screw 103 do not interfere with signals received by or emitted from wireless module 600. The wireless module 600 may be provided with an internal antenna. The antenna may be located in the enclosure 112 and/or base 102. The antenna may also extend entirely or partially outside of the lamp. In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety.

In some embodiments color control is used and RF control circuitry for controlling color may also be used in some embodiments. The lamp electronics may include light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. which is incorporated by reference herein in its entirety.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A LED lamp comprising:
   at least two LEDs providing light of at least two different spectral outputs; and
   an optic element comprising a refracting entry surface disposed to receive the light from the at least two LEDs, the refracting entry surface comprising a plurality of refracting surfaces wherein the plurality of refracting surfaces comprise a plurality of convex refracting surfaces alternating with a plurality of concave refracting surfaces, the refracting entry surface refracting the light tangentially.

2. A LED lamp comprising:
   at least two LEDs providing light of at least two different spectral outputs; and
   an optic element comprising a refracting entry surface disposed to receive the light from the at least two LEDs, wherein the optic element comprises a diffusive outer portion generating back light, the refracting entry surface refracting the light tangentially.

3. The LED lamp of claim 1 wherein the plurality of refracting surfaces extend radially on the refracting entry surface.

4. The LED lamp of claim 1 wherein the plurality of refracting surfaces comprise a plurality of continuously curved surfaces.

5. The LED lamp of claim 2 wherein the plurality of refracting surfaces comprise a plurality of convex refracting surfaces alternating with a plurality of concave refracting surfaces.

6. The LED lamp of claim 1 wherein the plurality of refracting surfaces extend along radii of the optic element where the center of the entry surface is centered over the at least two LEDs.

7. The LED lamp of claim 2 wherein the refracting entry surface is surrounded by an annular guide surface comprising a plurality of refracting surfaces that extend along a longitudinal axis of the lamp generally perpendicular to the refracting entry surface.

8. The LED lamp of claim 6 wherein at least some of the plurality of refracting surfaces do not extend to the center of the entry surface.

9. The LED lamp of claim 1 wherein at least some of the plurality of refracting surfaces extend for a different length than other ones of the plurality of refracting surfaces.

10. The LED lamp of claim 1 wherein the plurality of refracting surfaces cover at least 50% of the entry surface.

11. The LED lamp of claim 1 wherein the optic element comprises a diffusive outer portion generating back light.

12. A LED lamp comprising:
    a plurality of LEDs to provide light of at least two different spectral outputs disposed about a longitudinal axis; and
    an optic element comprising an entry surface disposed to receive the light from the plurality of LEDs, the entry surface comprising refracting surfaces that refract the light tangentially relative to the longitudinal axis wherein the refracting surfaces comprise a plurality of convex refracting surfaces and a plurality of concave refracting surfaces defining a sinusoidal line as the entry surface is traversed at a given radius.

13. The lamp of claim 12 wherein the refracting surfaces extend radially relative to the longitudinal axis.

14. The lamp of claim 2 wherein the refracting entry surface comprises a plurality of convex refracting surfaces and a plurality of concave refracting surfaces define a sinusoidal line as the entry surface is traversed at a given radius.

15. The LED lamp of claim 12 wherein at least some of the refracting surfaces do not extend to the longitudinal axis.

16. A LED lamp comprising:
at least two LEDs providing light of at least two different spectral outputs; and
an optic element comprising a first refracting entry surface disposed to receive the light from the at least two LEDs, the first refracting entry surface being disposed in a first plane and a second refracting entry surface disposed to receive the light from the at least two LEDs, the second refracting entry surface being disposed at an angle of other than 180 degrees relative to the first plane wherein the first refracting entry surface has a first plurality of refracting surfaces arranged in a first pattern and the second refracting entry surface has a second plurality of refracting surfaces arranged in a second pattern.

17. The LED lamp of claim 16 wherein the first refracting entry surface has an elongated shape where a width of the first refracting entry surface is smaller than a length of the first refracting entry surface.

18. The LED lamp of claim 16 wherein the first refracting entry surface has a first plurality of refracting surfaces arranged in a first pattern and a second plurality of refracting surfaces arranged in a second pattern.

19. The LED lamp of claim 16 wherein the top outer surface of the optic element is relatively flat.

20. A LED lamp comprising:
at least two LEDs providing light of at least two different spectral outputs; and
an optic element comprising a refracting entry surface disposed to receive the light from the at least two LEDs, the refracting entry surface refracting the light tangentially wherein the entry surface is surrounded by an annular guide surface comprising a plurality of refracting surfaces that extend along a longitudinal axis of the lamp generally perpendicular to the entry surface.

21. A LED lamp comprising:
at least two LEDs providing light of at least two different spectral outputs; and
an optic element comprising a refracting entry surface disposed to receive the light from the at least two LEDs, the refracting entry surface comprising a plurality of refracting surfaces wherein at least some of the plurality of refracting surfaces extend for a different length than other ones of the plurality of refracting surfaces, the refracting entry surface refracting the light tangentially.

* * * * *

UNITED STATES PATENT AND TRADEMARK OFFICE
CERTIFICATE OF CORRECTION

PATENT NO. : 10,172,215 B2
APPLICATION NO. : 15/166352
DATED : January 1, 2019
INVENTOR(S) : Tarsa et al.

It is certified that error appears in the above-identified patent and that said Letters Patent is hereby corrected as shown below:

On the Title Page

Item (56) References Cited, OTHER PUBLICATIONS, Page 2, Column 2, *Trade Show Hand-Out* Cite: Please replace entire citation with:
Trade Show Hand-Out, "Looking for Partner," received on or before Feb. 10, 2015, 20 pages.

In the Specification

Column 15, Line 31: Please correct "MEM" to read -- MHB --.

Signed and Sealed this
Twenty-eighth Day of May, 2019

Andrei Iancu
*Director of the United States Patent and Trademark Office*